US011255963B2

(12) United States Patent
Yoshitake et al.

(10) Patent No.: US 11,255,963 B2
(45) Date of Patent: Feb. 22, 2022

(54) SENSING DEVICE, MOBILE BODY SYSTEM, AND SENSING METHOD

(71) Applicant: OMRON Corporation, Kyoto (JP)

(72) Inventors: Naoki Yoshitake, Kusatsu (JP); Keiki Matsuura, Nara (JP); Yoshitaka Tsurukame, Tokyo (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/274,292

(22) PCT Filed: Nov. 14, 2019

(86) PCT No.: PCT/JP2019/044634
§ 371 (c)(1),
(2) Date: Mar. 8, 2021

(87) PCT Pub. No.: WO2020/129485
PCT Pub. Date: Jun. 25, 2020

(65) Prior Publication Data
US 2021/0341597 A1    Nov. 4, 2021

(30) Foreign Application Priority Data
Dec. 20, 2018 (JP) .............................. JP2018-238697

(51) Int. Cl.
*G01S 13/931* (2020.01)
*G08G 1/16* (2006.01)
(52) U.S. Cl.
CPC ............ *G01S 13/931* (2013.01); *G08G 1/167* (2013.01); *G01S 2013/9315* (2020.01); *G01S 2013/9322* (2020.01)
(58) Field of Classification Search
CPC ........... G01S 13/931; G01S 2013/9322; G01S 2013/9315; G08G 1/167
See application file for complete search history.

(56) References Cited

U.S. PATENT DOCUMENTS 8,310,353 B2 * 11/2012 Hinninger .............. B60Q 9/008
340/435
9,501,932 B2 * 11/2016 Sakai ..................... G08G 1/161
(Continued)

FOREIGN PATENT DOCUMENTS

JP     2004046426 A     2/2004
JP     2009301146 A    12/2009
(Continued)

OTHER PUBLICATIONS

International Search Report for International Application No. PCT/JP2019/044634; dated Jan. 28, 2020.
(Continued)

*Primary Examiner* — Sisay Yacob
(74) *Attorney, Agent, or Firm* — Cantor Colburn LLP

(57) ABSTRACT

A sensing device detects an object in a blind spot in a surrounding environment of a mobile body. The sensing device includes a distance measurer, a detector, a controller, and a state receiver. The distance measurer acquires distance information indicating a distance from the mobile body to the surrounding environment. The detector detects the object in the blind spot. The controller controls operation of the detector. The state receiver acquires condition information indicating a state relating to slipperiness of the mobile body on a road surface on which the mobile body travels. The contoller detects the blind spot in the surrounding environment, based on the distance information acquired by the distance measurer. The controller controls precision at which the detector is caused to detect the object in the blind spot, according to the condition information acquired by the state receiver.

12 Claims, 18 Drawing Sheets

(56) References Cited

U.S. PATENT DOCUMENTS

| | | | | |
|---|---|---|---|---|
| 2006/0206243 | A1* | 9/2006 | Pawlicki | G06K 9/00825 |
| | | | | 701/1 |
| 2009/0243822 | A1* | 10/2009 | Hinninger | B60Q 9/008 |
| | | | | 340/435 |
| 2012/0059789 | A1 | 3/2012 | Sakai et al. | |
| 2017/0032675 | A1 | 2/2017 | Sakai et al. | |

FOREIGN PATENT DOCUMENTS

| | | | |
|---|---|---|---|
| JP | 2010267211 | A | 11/2010 |
| JP | 2011242860 | A | 12/2011 |
| JP | 2013196033 | A | 9/2013 |

OTHER PUBLICATIONS

PCT Written Opinion of the International Searching Authority for International Application No. PCT/JP2019/044634 dated Jan. 28, 2020.

\* cited by examiner

SENSING DEVICE, MOBILE BODY SYSTEM, AND SENSING METHOD

CROSS REFERENCE TO RELATED APPLICATIONS

This is the U.S. national stage of application No. PCT/JP2019/044633, filed on Nov. 14, 2019. Priority under 35 U.S.C. § 119(a) and 35 U.S.C. § 365(b) is claimed from Japanese Application No. 2018-238697, filed Dec. 20, 2018, the disclosure of which is also incorporated herein by reference.

TECHNICAL FIELD

The present disclosure relates to a sensing device that detects a peripheral object from a mobile body, a mobile body system including the sensing device, and a sensing method.

BACKGROUND ART

A technique that is mounted on a mobile body such as an automobile or an automated guided vehicle (AGV) for monitoring the periphery of the mobile body has been proposed (e.g., Patent Documents 1 and 2).

Patent Document 1 discloses an obstacle recognition device that recognizes an obstacle in front of an own vehicle. The obstacle recognition device of Patent Document 1 includes a camera and a radar, detects a blind spot region for an own vehicle, and estimates the attribute of an obstacle that may exist in the blind spot region based on the size of the detected blind spot region. The obstacle recognition device causes the camera to search the blind spot region when it is estimated that the attribute of the obstacle that may exist in the blind spot region is a pedestrian, and causes the radar to search the blind spot region when it is estimated that the attribute of the obstacle is another vehicle.

Patent Document 2 discloses a vehicle environment estimation device for the purpose of accurately estimating a traveling environment around an own vehicle. The vehicle environment estimation device of Patent Document 2 detects the behavior of other vehicles around the own vehicle, and estimates, based on the behavior of the vehicles, the existence of another vehicle traveling in a blind spot region from the own vehicle. In this way, a vehicle traveling environment that cannot be recognized by the own vehicle and can be recognized by other vehicles on the periphery is estimated.

CITATION LIST

Patent Documents

Patent Document 1: JP 2011-242860 A
Patent Document 2: JP 2010-267211 A

SUMMARY

Problems to be Solved

In Patent Document 1, prior to the search in a blind spot region by the camera or the like, it is estimated whether an object that may exist in the region is a pedestrian or another vehicle based on the size of the region. In Patent Document 2, the inside of a blind spot region is estimated based on a detection result around an own vehicle. However, they do not estimate whether the situation needs to detect the inside of a blind spot in the first place, or whether the necessity is high or low. Thus, in the prior art, efficiently performing the detection of an object in a blind spot according to a situation is difficult.

An object of the present disclosure is to provide a sensing device, a sensing method, and a mobile body system capable of efficiently detecting an object in a blind spot in a surrounding environment of a mobile body.

Means for Solving the Problem

A sensing device according to an aspect of the present disclosure is for detecting an object in a blind spot in a surrounding environment of a mobile body. The sensing device includes a distance measurer, a detector, a controller, and a state receiver. The distance measurer is configured to acquire distance information indicating a distance from the mobile body to the surrounding environment. The detector is configured to detect the object in the blind spot. The controller is configured to control operation of the detector. The state receiver is configured to acquire condition information indicating a state relating to slipperiness of the mobile body on a road surface on which the mobile body travels. The controller is configured to detect the blind spot in the surrounding environment, based on the distance information acquired by the distance measurer. The controller is configured to control precision at which the detector is caused to detect the object in the blind spot, according to the condition information acquired by the state receiver.

A mobile body system according to an aspect of the present disclosure includes: the sensing device according; and a control device arranged on the mobile body to execute operation according to a detection result of the object in the blind spot by the sensing device.

A sensing method according to an aspect of the present disclosure is a sensing method of detecting an object in a blind spot in a surrounding environment of a mobile body. The sensing method includes: acquiring, by a distance measurer, distance information indicating a distance from the mobile body to the surrounding environment; and detecting, by a controller, the blind spot in the surrounding environment, based on the distance information. The present method includes acquiring, by a state receiver, condition information indicating a state relating to slipperiness of the mobile body on a road surface on which the mobile body travels. The present method includes: controlling, by the controller, precision at which a detector is caused to detect an object in the blind spot, according to the condition information; and detecting, by the detector, the object in the blind spot at the precision.

The sensing device, the sensing method, and the mobile body system according to the present disclosure is capable of efficiently detecting an object in a blind spot in a surrounding environment of a mobile body.

DETAILED DESCRIPTION

Figure 1:
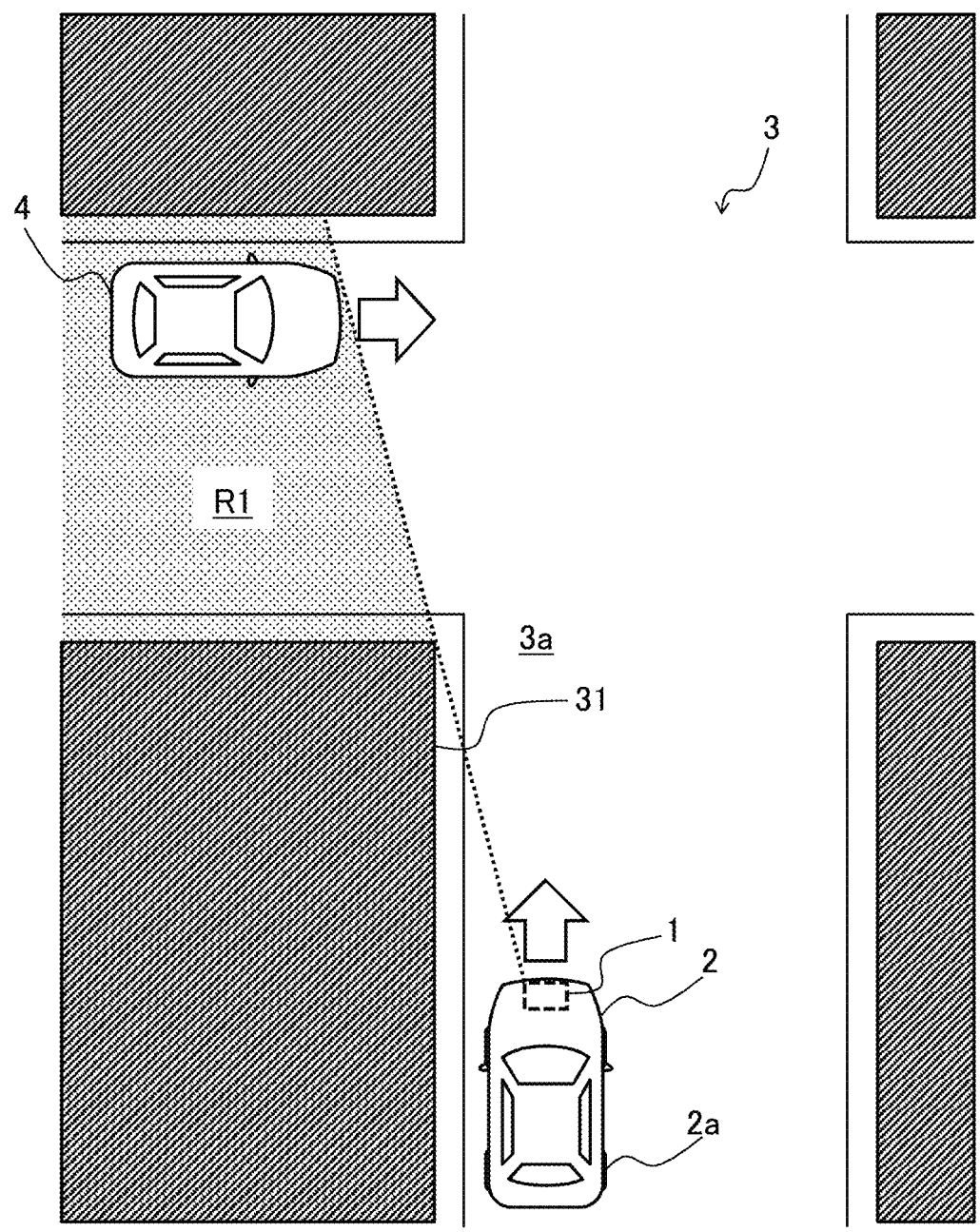
FIG. 1 is a diagram for describing an application example of a sensing device according to the present disclosure.

Hereinafter, embodiments of the sensing device and method, and the mobile body system according to the present disclosure will be described with reference to the accompanying drawings. Note that, in each of the embodiments below, the same reference numerals are given to the same constituents.

Application Example

Figure 2:
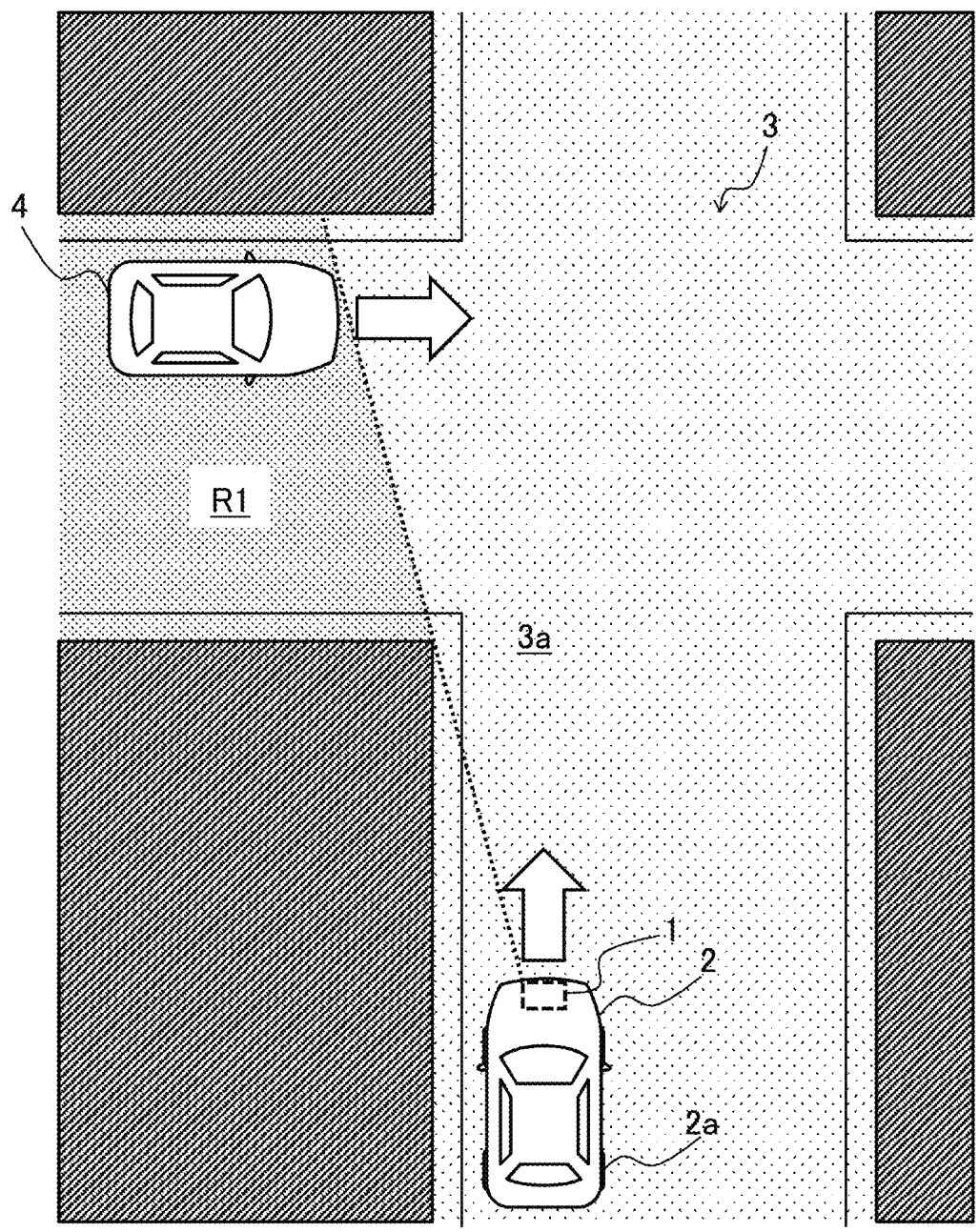
FIG. 2 is a diagram exemplifying a situation different from FIG. 1 of a mobile body in the application example of the sensing device.

An example to which the sensing device and method, and the mobile body system according to the present disclosure can be applied will be described with reference to FIG. 1 and FIG. 2. FIG. 1 is a diagram for describing an application example of the sensing device 1 according to the present disclosure. FIG. 2 is a diagram exemplifying a situation different from FIG. 1 of a mobile body in the present application example.

The sensing device 1 according to the present disclosure can be applied to, for example, in-vehicle use, and constitutes a mobile body system in a mobile body such as an automobile. FIG. 1 exemplifies a traveling state of a vehicle 2 on which the sensing device 1 is mounted. The mobile body system according to the present application example uses, for example, the sensing device 1 to monitor the surrounding environment that changes around the own vehicle 2 that is traveling. The surrounding environment includes, for example, structures such as a building and a utility pole existing around the own vehicle 2, and various objects such as moving objects such as a pedestrian and another vehicle.

In the example of FIG. 1, a wall 31 of a structure near an intersection 3 blocks a range that can be monitored from the own vehicle 2, and thus a blind spot occurs. The blind spot indicates a place that cannot be seen directly geometrically depending on the surrounding environment from a mobile body such as the own vehicle 2. In the present example, another vehicle 4 approaching an intersection 3 from a side road exists in the blind spot region R1 which is a region of the blind spot from the own vehicle 2. In the above case, it is concerned that the vehicle 4 from a blind spot and the own vehicle 2 might collide with each other at the crossing.

In view of the above, the sensing device 1 of the present embodiment detects an object existing in the blind spot region R1 (hereinafter, may be referred to as a "blind spot object") such as the vehicle 4, and determines a risk level based on a detection result of the blind spot object 4. The risk level relates to the possibility that the own vehicle 2 and the blind spot object 4 collide with each other, for example. The sensing device 1 can perform various control of driving support or driving control for warning to avoid a collision at the crossing or the like in accordance with a determination result of the risk level.

In FIG. 2, as an example of a situation different from that of FIG. 1, a situation is exemplified in which a road surface 3a is frozen at the intersection 3 similar to that in FIG. 1. Note that, in the situation of FIG. 1, it is assumed that the road surface 3a is dry.

In the situation of FIG. 2, it is presumed that a braking distance of the own vehicle 2 is larger (i.e., more slippery) than in the situation of FIG. 1. In the slippery situation as shown in FIG. 2, it is considered that attention for the blind spot object 4 that might collide with the own vehicle 2 at the crossing is required more than in the normal situation as shown in FIG. 1. Therefore, it is helpful to detect the inside of a blind spot (inside the blind spot region R1) more precisely than usual when the own vehicle 2 is in a slippery situation.

In view of the above, the sensing device 1 of the present embodiment controls the precision for detecting the inside of the blind spot according to various states related to slipperiness when the own vehicle 2 travels on the road surface 3a. The precision indicates what degree the sensing device 1 detects the blind spot object 4 precisely in the blind spot region R1 (hereinafter, also referred to as "sensing density"). By controlling the sensing density in the sensing device 1, it is possible to improve the detection accuracy in a situation where there is a high possibility of a collision at the crossing, and to efficiently detect the blind spot object 4. Further, it is possible to improve the safety of the user such as a driver in a case where a condition of a road surface or the like is bad.

CONFIGURATION EXAMPLE

Hereinafter, embodiments as a configuration example of the mobile body system including the sensing device 1 will be described.

First Embodiment

A configuration and operation of the mobile body system according to the first embodiment will be described below.

1. Configuration

Figure 3:
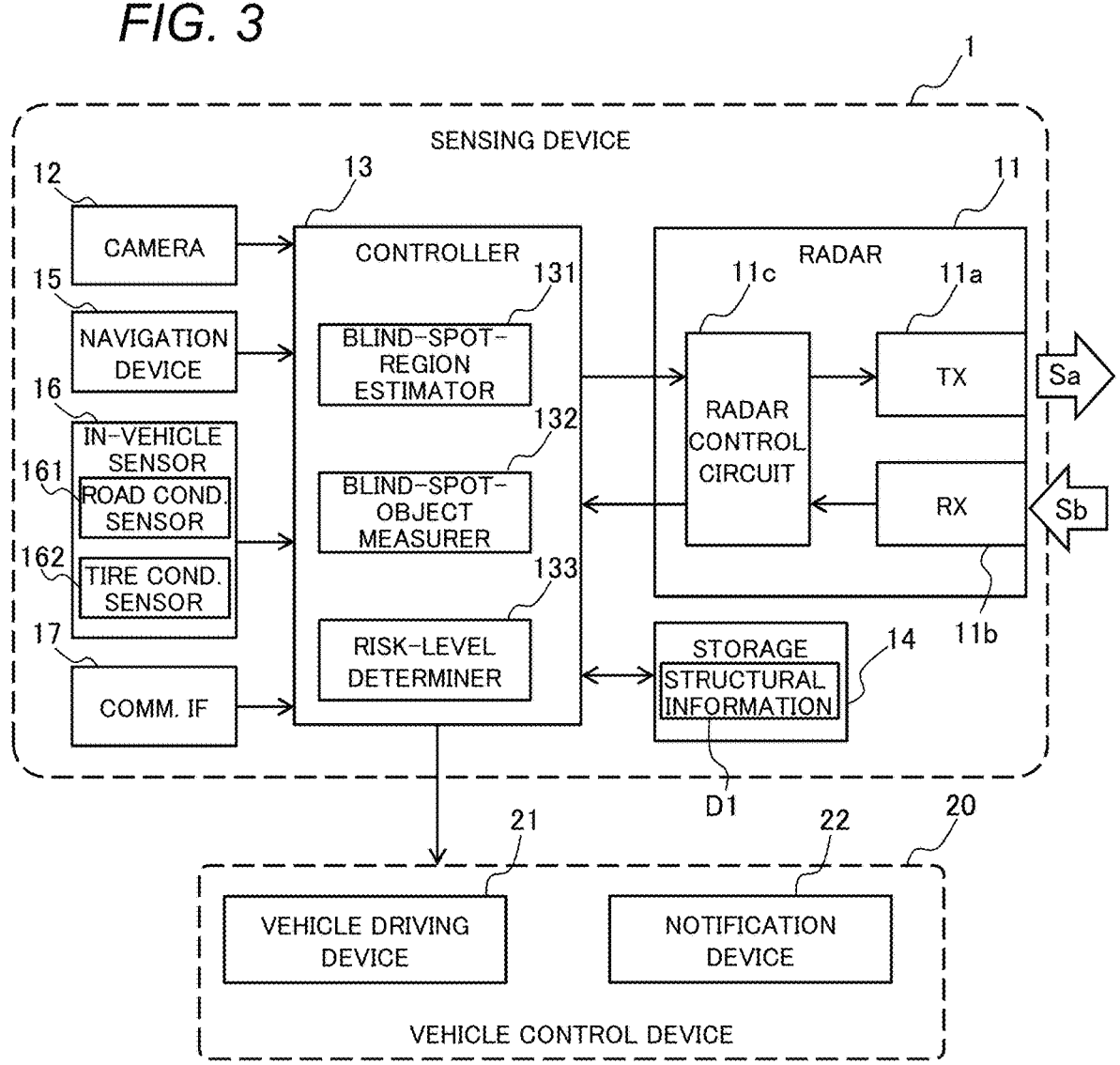
FIG. 3 is a block diagram exemplifying a configuration of a mobile body system according to a first embodiment of the present disclosure.

The configuration of the mobile body system according to the present embodiment will be described with reference to FIG. 3. FIG. 3 is a block diagram exemplifying the configuration of the present system.

As exemplified in FIG. 3, the present system includes the sensing device 1 and a vehicle control device 20. The sensing device 1 of the present embodiment includes a radar 11, a camera 12, and a controller 13. For example, the sensing device 1 further includes a storage 14, a navigation device 15, an in-vehicle sensor 16, and a communication interface 17. The vehicle control device 20 includes various in-vehicle devices mounted on the own vehicle 2, and is used for driving support or automatic driving, for example.

In the sensing device 1, the radar 11 includes, for example, a transmitter 11a, a receiver 11b, and a radar control circuit 11c. The radar 11 is an example of a detector in the present embodiment. The radar 11 is installed on the front grill, the windshield, or the like of the own vehicle 2 so as to transmit and receive a signal toward the front (see FIG. 1) in the traveling direction of the own vehicle 2, for example.

The transmitter 11a includes, for example, an antenna having variable directivity (phased array antenna or the like), a transmission circuit for causing the antenna to transmit the physical signal Sa to the outside, and the like. The physical signal Sa includes, for example, at least one of a millimeter wave, a microwave, a radio wave, and a terahertz wave. The physical signal Sa is an example of an output signal by the detector in the present embodiment.

The receiver 11b includes, for example, an antenna having variable directivity, a receiving circuit for receiving the wave signal Sb from the outside by the antenna, and the like. The wave signal Sb is set in the same wavelength band as the physical signal Sa so as to include the reflected wave of the physical signal Sa. Note that the transmitter 11a and the receiver 11b may use a shared antenna or may be integrally configured, for example.

The radar control circuit 11c controls the transmitting and receiving of a signal by the transmitter 11a and the receiver 11b. The radar control circuit 11c starts transmitting and receiving of a signal by the radar 11 or controls the direction in which the physical signal Sa is radiated from the transmitter 11a, for example, by a control signal from the controller 13. Further, the radar control circuit 11c radiates the physical signal Sa from the transmitter 11a to scan a predetermined range such as the surrounding environment, and detects the wave signal Sb indicating the reflected wave of the physical signal Sa in a receiving result of the receiver 11b.

The radar 11 operates according to a modulation system such as a continuous wave (CW) system or a pulse system, and measures the distance, direction, speed, and the like of an external object. The CW system includes a two-wave CW system, an FM-CW system, a spread spectrum system, and the like. The pulse system may be a pulse-Doppler system, or may use pulse compression of a chirp signal or pulse compression of a PN sequence. The radar 11 uses, for example, coherent phase information control. The radar 11 may use an incoherent system.

The camera 12 is installed at a position where, for example, a range superimposed on a range in which the physical signal Sa can be radiated from the radar 11 in the own vehicle 2 can be imaged. For example, the camera 12 is installed on the windshield or the like of the own vehicle 2 with an orientation frontward for the own vehicle 2, for example (see FIG. 1). For a blind spot in the sensing device 1, the installation position of the camera 12 may be used as a geometrical reference or the installation position of the radar 11 may be used as a reference.

The camera 12 captures an external image from the installation position and generates a captured image. The camera 12 outputs image data indicating the captured image to the controller 13. The camera 12 is, for example, an RGB-D camera, a stereo camera, or a distance image sensor. The camera 12 is an example of a distance measurer (or monitor) in the present embodiment.

The controller 13 includes a CPU, a RAM, a ROM, and the like, and controls each constituent according to information processing. The controller 13 is composed of, for example, an electronic controller (ECU). The controller 13 loads a program stored in the storage 14 into a RAM, and the CPU interprets and executes the program loaded into the RAM. As a software module realized in this way, for example, the controller 13 realizes a blind-spot-region estimator 131, a blind-spot-object measurer 132, and a risk-level determiner 133. Each of the modules 131 to 133 will be described later.

The storage 14 stores a program executed by the controller 13, various data, and the like. For example, the storage 14 stores structural information D1 described later. The storage 14 includes, for example, a hard disk drive or a solid state drive. Further, the RAM and the ROM may be included in the storage 14.

The above programs and the like may be stored in a portable storage medium. The storage medium is a medium that stores information such as a program and the like by an electrical, magnetic, optical, mechanical, or chemical action so that a computer, other devices and machines can read the stored information of the program and the like. The sensing device 1 may acquire the program and the like from the storage medium.

The navigation device 15 is an example of a distance measurer (or monitor) including, for example, a memory for storing map information and a GPS receiver.

The in-vehicle sensor 16 is various sensors mounted on the own vehicle 2, and includes, e.g., a vehicle speed sensor, an acceleration sensor, a gyro sensor, and the like. The in-vehicle sensor 16 detects the speed, acceleration, angular velocity, and the like of the own vehicle 2. The in-vehicle sensor 16 includes a road condition sensor 161 and a tire condition sensor 162, for example.

The road condition sensor 161 is an example of a state receiver that detects various road conditions for the road surface 3a (FIG. 1) on which the own vehicle 2 travels. The road condition includes: e.g., one or more of degree of humidity, such as dryness, semi-humid, or wet; the presence or absence of a water pool due to various liquid such as water or oil; snow coverage (including compressed snow); and frozen (including sherbet-like). The road condition may include various unevenness and materials of the road surface.

The road condition sensor 161 may be configured in an ultrasonic system that detects a road condition by reflection of an ultrasonic wave, or may be a radio wave system by a radio wave. Further, the road condition sensor 161 may be in an optical system such as LIDAR, or may measure the thickness of water, ice, snow, or the like on the road surface according to the optical measurement principle. The road condition sensor 161 may be composed of a radiation thermometer, and may detect, for example, whether or not the temperature of the road surface is 0° C. or less. The road condition sensor 161 may be a wheel speed sensor system that calculates a road condition by performing analysis, such as statistical processing, on a wheel speed signal of the own vehicle 2, or a composite sensor system that calculates a road condition from a gyro sensor, an acceleration sensor, a shock sensor, a microphone, or the like.

The tire condition sensor 162 is an example of a state receiver that detects a condition of a tire such as the grip force for a tire 2a (FIG. 1) of the own vehicle 2, for example. For example, the tire condition sensor 162 is configured by incorporating sensors for air pressure, temperature, strain, acceleration, and the like inside at least one of the tires 2a of the own vehicle 2. For example, the tire condition sensor 162 detects a wear amount based on an acceleration. Further, the tire condition sensor 162 may detect air pressure and compare data related to a type and a rotational movement of a tire set in advance. The tire condition sensor 162 may be an image sensor that captures an image of the surface of the tire 2a, and may detect a wear amount by measuring a tire groove.

The tire condition sensor 162 and the road condition sensor 161 may be integrally configured. For example, the road condition sensor 161 may be in a vibration system built in the tire 2a of the own vehicle 2, or may detect acceleration, internal pressure, temperature, and the like in the tire circumferential direction.

A communication interface 17 is an example of a state receiver that receives various information from the outside. For example, information indicating the weather regarding the place where the own vehicle 2 travels may be received by information communication with the Internet or various external devices, and the road condition may be detected based on the received information. Further, the communication interface 17 may receive information indicating the road condition on which the own vehicle 2 travels from a sensor or the like provided to detect the road condition provided as a traffic infrastructure facility. The sensing device 1 may transmit and receive information to and from another vehicle or the like by the communication interface 17 to share information indicating the road condition.

The above configuration is an example, and the sensing device 1 is not limited to the above configuration. For example, the state receiver may be implemented by analyzing an image with the camera 12 to detect the road condition. The sensing device 1 does not have to include the navigation device 15 or the in-vehicle sensor 16. Further, the controller 13 of the sensing device 1 may be composed of a plurality of hardware resources that separately execute each of the above units 131 to 133. The controller 13 may be composed of various semiconductor integrated circuits such as a CPU, an MPU, a GPU, a microcomputer, a DSP, an FPGA, and an ASIC.

The vehicle control device 20 is an example of a control device of the mobile body system according to the present embodiment. The vehicle control device 20 includes, for example, a vehicle driving device 21 and a notification device 22. The vehicle driving device 21 is composed of, for example, an ECU, and drives and controls each unit of the own vehicle 2. For example, the vehicle driving device 21 controls the brake of the own vehicle 2 to realize automatic braking.

The notification device 22 notifies the user of various information by means of an image, a sound, or the like. The notification device 22 is, for example, a display device such as a liquid crystal panel or an organic EL panel mounted on the own vehicle 2. The notification device 22 may be a voice output device that outputs an alarm or the like by voice.

In the sensing device 1 of the present embodiment, a detector may be configured by the cooperation of a radar 11 and a controller 13 (blind-spot-object measurer 132). Further, a distance measurer may also be configured in cooperation with the controller 13. A state receiver may also be configured in cooperation with the controller 13. Further, the state receiver may be integrally configured with the detector and/or the distance measurer.

2. Operation

The operation of the mobile body system and the sensing device 1 configured as described above will be described below.

The mobile body system according to the present embodiment operates the sensing device 1 to monitor the surrounding environment, when the own vehicle 2 is driven, for example. The vehicle control device 20 of the present system performs various control for driving support, automatic driving, or the like of the own vehicle 2 based on the detection result by the sensing device 1.

The sensing device 1 of the present embodiment captures an image around the own vehicle 2 with a camera 12 and monitors the surrounding environment of the own vehicle 2, for example. A blind-spot-region estimator 131 of the sensing device 1 in turn detects a region where a blind spot is estimated in the current surrounding environment, based on distance information indicating various distances in the monitoring result and the like, for example.

In the sensing device 1, when the blind-spot-region estimator 131 finds a blind spot, the blind-spot-object measurer 132 measures an internal state of the blind spot region R1 using the radar 11. It is expected that the physical signal Sa radiated from the radar 11 of the own vehicle 2, which has a wave-like property, may generate the propagation in which the physical signal Sa causes multiple reflections, diffractions, or the like to reach the blind spot object 4 in the blind spot region R1, and further returns to the own vehicle 2. The sensing method of the present embodiment detects the blind spot object 4 by utilizing a wave propagating as described above.

A risk-level determiner 133 of the present embodiment determines a risk level of the blind spot object 4 that may exist in the blind spot region R1 based on a measurement result of the blind-spot-object measurer 132. The risk level indicates the degree to which a collision between the blind spot object 4 and the own vehicle 2 is expected to be possible, for example.

For example, when the sensing device 1 determines a risk level that is presumed to require a warning, the present system can notify the driver or the like by the notification device 22 or execute vehicle control for enhancing the safety such as automatic braking by the vehicle driving device 21.

The sensing device 1 of the present embodiment dynamically sets the sensing density, which is the precision when the radar 11 is made to perform the detection in the blind spot region R1 in the sensing method as described above. The details of the operation of the sensing device 1 in the present system will be described below.

2-1. Operation of Sensing Device

The operation of the sensing device 1 according to the present embodiment will be described with reference to FIG. 4 to FIG. 7.

Figure 4:
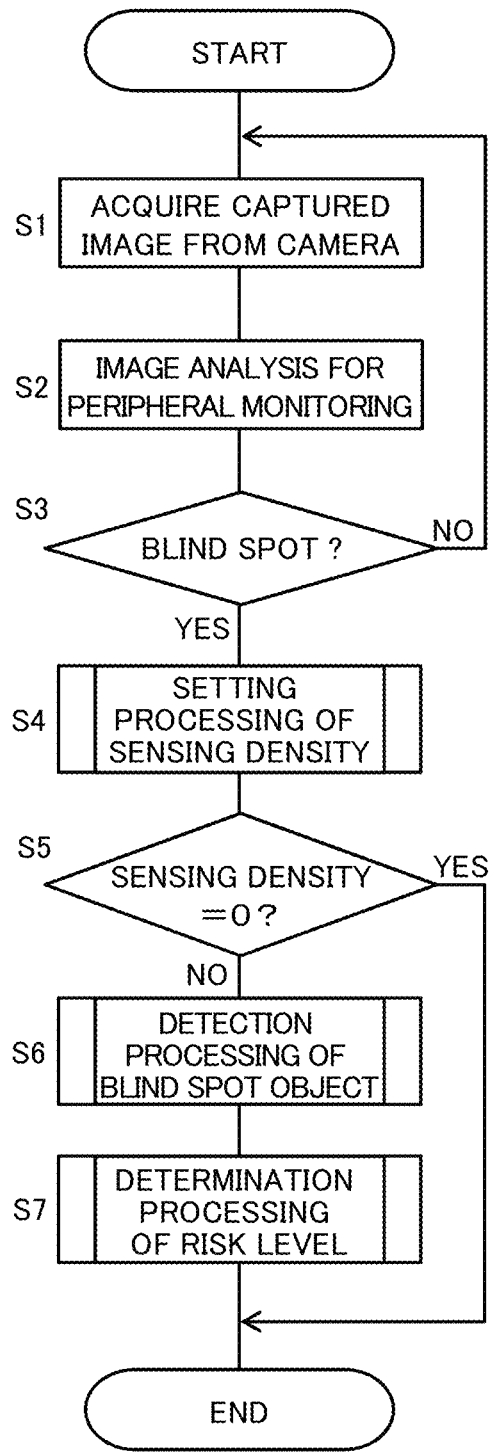
FIG. 4 is a flowchart for describing operation of the sensing device according to the first embodiment.

FIG. 4 is a flowchart for describing the operation of the sensing device 1 according to the present embodiment. Each processing shown in the flowchart of FIG. 4 is executed by the controller 13 of the sensing device 1. The present flowchart is started at a predetermined cycle, for example, while the vehicle 2 is driven.

At first, the controller 13 acquires a captured image of one or more frames from the camera 12 (S1). In step S1, the controller 13 may acquire a distance image as the captured image, or may generate a distance image based on the acquired captured image. The distance image is an example of distance information indicating various distances for monitoring the surrounding environment.

Figure 5:
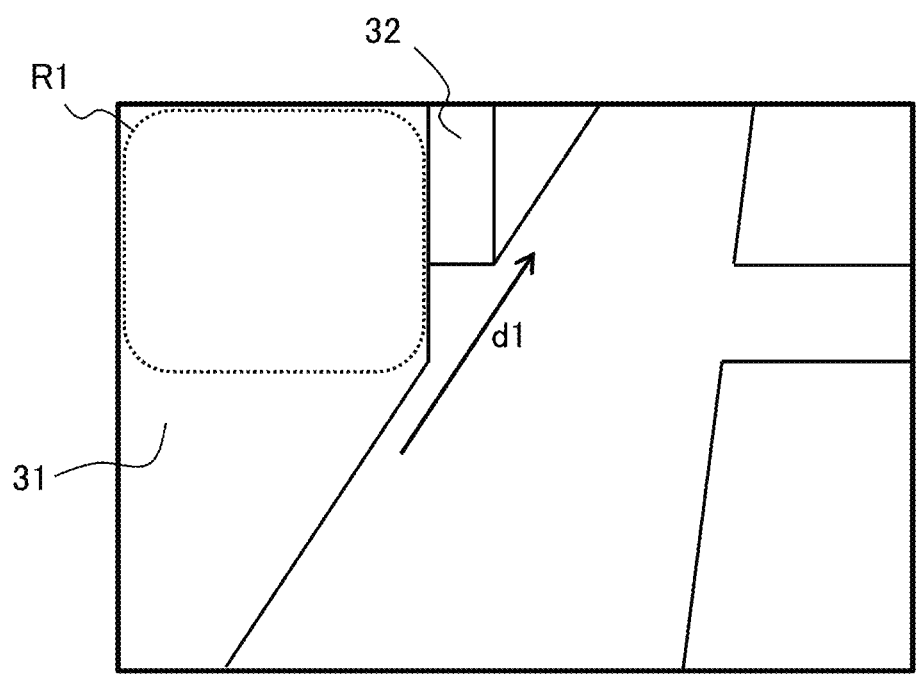
FIG. 5 is a diagram for describing an example of distance information in the sensing device.

Next, the controller 13 performs various image analysis for peripheral monitoring on the acquired captured image (S2). For example, the controller 13 generates structural information D1 regarding the current surrounding environment of the own vehicle 2. The structural information D1 is information indicating various object structures in the surrounding environment, and includes distances to various structures, for example. Further, the controller 13, operating as the blind-spot-region estimator 131 in step S2, performs detection of a blind spot by image analysis on the acquired captured image. FIG. 5 exemplifies an image to be analyzed in step S2.

In an example of FIG. 5, an image is captured from the own vehicle 2 as a distance image (S1), and the image shows walls 31 and 32 formed by a plurality of structures in the vicinity of the intersection 3. In the present example, the blind spot region R1 exists on the back side of the wall 31 due to shielding by the wall 31 in the vicinity of the own vehicle 2. Further, the wall 32 on the back side of the blind spot region R1 faces the own vehicle 2. Hereinafter, the wall 31 is referred to as a "shielding wall", and the wall 32 is referred to as a "facing wall". A boundary between the blind spot region R1 and the outside is formed between the shielding wall 31 and the facing wall 32 (see FIG. 1).

In step S2, for example, the controller 13 extracts distance values of the various walls 31 and 32 in the distance image as structural information D1 for each pixel and holds them in a storage 14. In the case of FIG. 5, the distance value changes continuously from the side of the own vehicle 2 for the size of the shielding wall 31 along a direction dl, and changes discontinuously from an end portion (i.e., a blind spot end 31a (FIG. 9)) of the shielding wall 31 to the facing wall 32. The controller 13 can estimate the existence of the blind spot region R1 by analyzing the change in the distance value as described above.

Returning to FIG. 4, the controller 13 as the blind-spot-region estimator 131 determines whether or not the blind spot region R1 is detected in the current surrounding environment of the own vehicle 2 according to an estimation result by image analysis, for example (S3). When determining that the blind spot region R1 is not detected (NO in S3), the controller 13 periodically repeats the processing of steps S1 to S3, for example.

When determining that the blind spot region R1 is detected (YES in S3), the controller 13 performs setting processing of the sensing density, for example (S4). The setting processing of the sensing density is processing of setting the sensing density in the detection in the blind spot region R1. In the present embodiment, the processing of step S4 sets the sensing density larger, as the road condition is the more slippery. The details of the processing in step S4 will be described later.

For example, in a case where a sensing density higher than "0" is set (YES in S5), the controller 13 executes detection processing of a blind spot object in the set sensing density (S6). In the present embodiment, the blind spot object 4 in the blind spot region R1 is detected by utilizing a multiple reflected wave in the wave signal Sb of the radar 11.

Figure 6A:
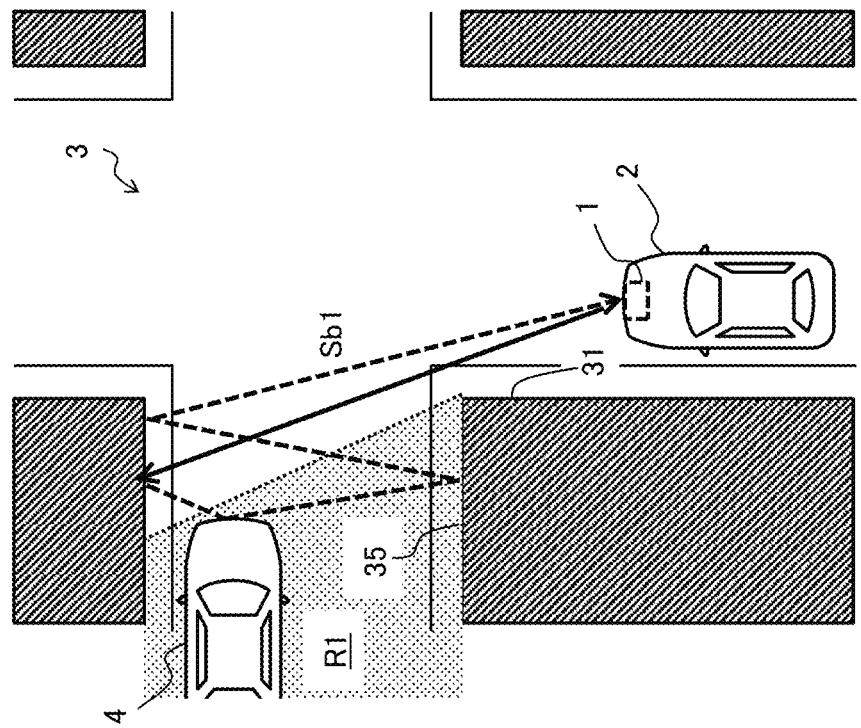
FIG. 6A and FIG. 6B are diagrams for describing the operation of the sensing device according to the first embodiment.
Figure 6B:
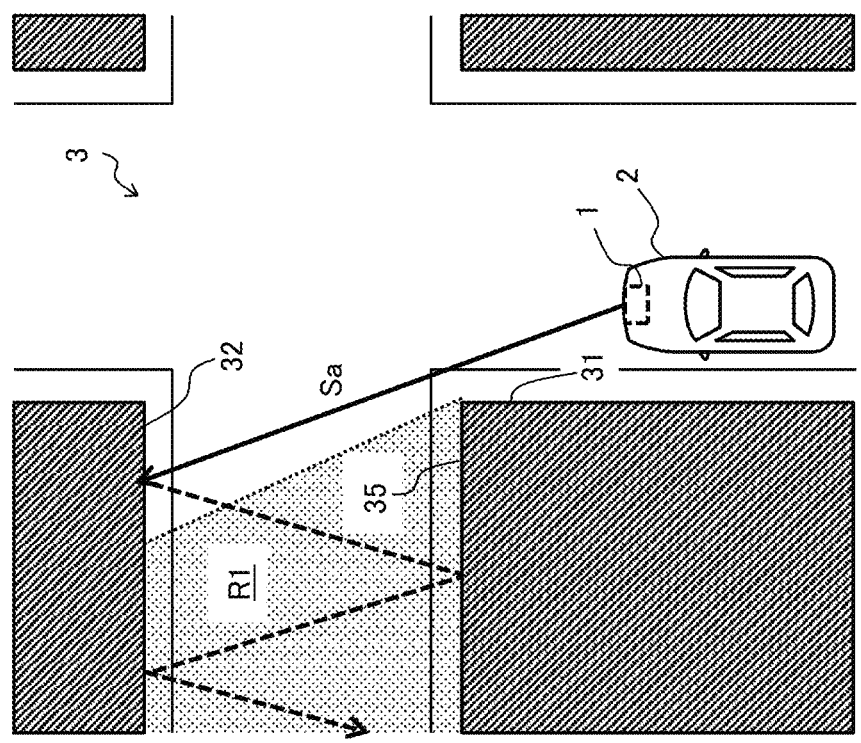

In step S6, the controller 13 radiates the physical signal Sa from the radar 11 in a manner scanning a range of the facing wall 32 and the like in the vicinity of the boundary of the blind spot region R1, based on the analysis result of FIG. 5, for example. FIG. 6A and FIG. 6B exemplify a propagation path of the physical signal Sa in step S6 in cases where there is and there is not the blind spot object 4, respectively.

In the example of FIG. 6A, the physical signal Sa from the radar 11 of the own vehicle 2 is repeatedly reflected between the facing wall 32 and a wall 35 on the opposite side via the blind spot region R1 of a side road, and propagates as a multiple reflected wave. In the example of FIG. 6A, the multiple reflected wave does not come toward the own vehicle 2 corresponding to the absence of the blind spot object 4.

In contrast, in the example of FIG. 6B, as the blind spot object 4 exists, the physical signal Sa from the radar 11 is reflected by the blind spot object 4 in addition to the walls 32 and 33, respectively, so as to be a multiple reflected wave Rb1 directed toward the own vehicle 2. Therefore, the wave signal Sb received by the radar 11 includes a signal component of the multiple reflected wave Rb1 having the information of the blind spot object 4.

A signal component of the multiple reflected wave Rb1 (FIG. 6b) has information according to the speed of the blind spot object 4 as a reflection source and the length of the propagation path by the Doppler shift, the phase and the propagation time. By analyzing such a signal component, the detection processing of a blind spot object (S6) detects the speed, position, and the like of the blind spot object 4 that reflects the multiple reflected wave Rb1. The details of the processing in step S6 will be described later.

Returning to FIG. 4, the controller 13 performs determination processing of a risk level based on a detection result (S6) of the blind spot object 4 (S7). In the determination processing of a risk level, a risk level is determined as the necessity of a warning regarding the detected blind spot object 4, and various control signals are output to a vehicle control device 20 according to a determination result, for example. When determining in step S7 that a warning is required, the controller 13 generates a control signal for causing a notification device 22 to notify the warning or controlling a vehicle driving device 21.

In a case where information of the movement, distance, type, shape, and the like of the blind spot object 4 is detected in step S6, the risk level may be determined using such information in step S7. The details of the processing in step S7 will be described later.

When, outputting a control signal (S8), the controller 13 ends the processing shown in the flowchart of FIG. 4, for example.

Further, when the sensing density is set to "0" in step S4 (YES in S5), the controller 13 ends the processing according to the present flowchart without performing the detection processing of a blind spot object (S6) or the like. The controller 13 executes the present flowchart again after a period of a predetermined cycle elapses, for example.

According to the above processing, with performing peripheral monitoring of the own vehicle 2 (S1 to S3), the sensing device 1 detects the blind spot object 4 (S6) when a blind spot is found (YES in S3), so as to perform various actions according to a risk level (S7). At this time, the more slippery the road condition is, the higher the sensing density for the detection processing of a blind spot object (S6) is set (S4). Consequently, the detection in a blind spot can be performed with high accuracy as needed, and the processing efficiency of the sensing device 1 can be improved.

Figure 7:
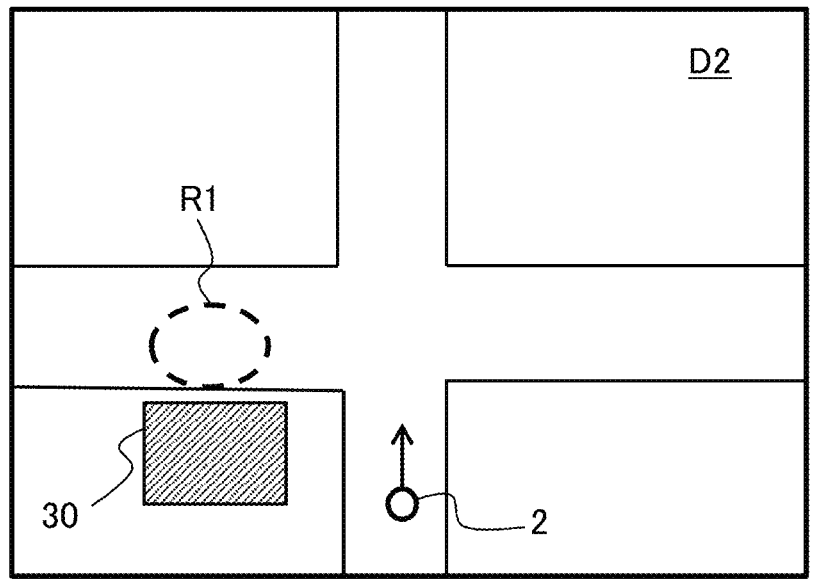
FIG. 7 is a diagram for describing a variation of the distance information in the sensing device.

In the above processing, the camera 12 is used for the peripheral monitoring. However, the navigation device 15 may be used. The present variation is shown in FIG. 7. As shown in FIG. 7, the navigation device 15 calculates various distances to the own vehicle 2 in map information D2 of the surrounding environment of the own vehicle 2 and monitors the current position of the own vehicle 2. The controller 13 can use the monitoring result of the navigation device 15 as described above for various processing shown in FIG. 4. The controller 13 can acquire the structural information D1 and detect the blind spot region R1 based on the monitoring result of the navigation device 15, based on a structure 30 in the map information D2, for example (S2). Further, the controller 13 may appropriately use a detection result of the in-vehicle sensor 16 in the processing of FIG. 4.

In the above processing, in a case where an obstacle is detected outside a blind spot in peripheral monitoring (S2), the controller 13 may determine a risk level regarding the obstacle outside the blind spot and issue various warnings according to a determination result, for example.

2-2. Setting Processing of Sensing Density

The setting processing of the sensing density (S4 in FIG. 4) will be described with reference to FIG. 8 to FIG. 9. Hereinafter, an example of controlling the sensing density by using a distance to a blind spot together with a road condition will be described.

Figure 8:
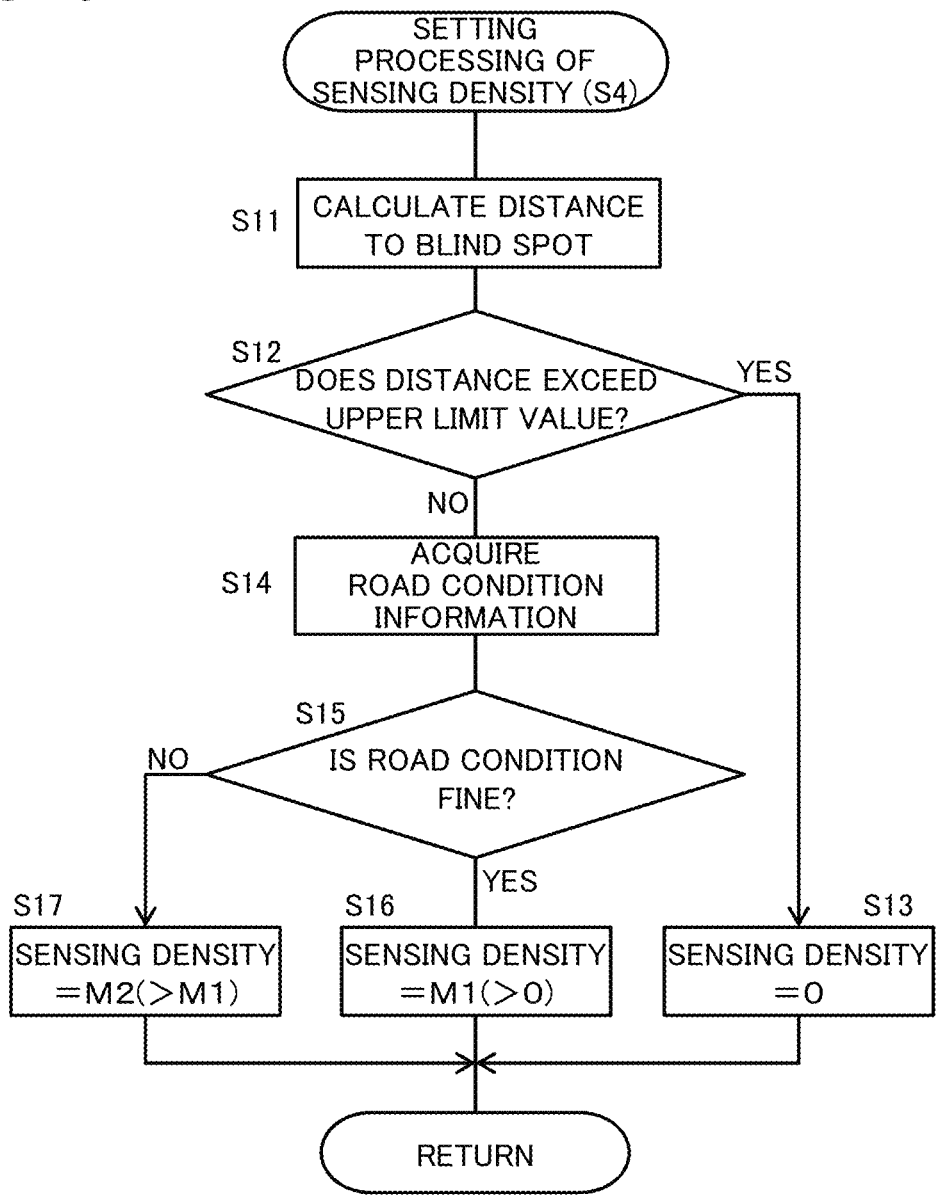
FIG. 8 is a flowchart exemplifying a setting processing of a sensing density according to the first embodiment.

FIG. 8 is a flowchart exemplifying the setting processing of the sensing density according to the present embodiment. FIG. 9 is a diagram for describing the setting processing of the sensing density according to the present embodiment. The processing by the flowchart of FIG. 8 is executed by the controller 13 in step S4 of FIG. 4.

At first, the controller 13 calculates a distance to a blind spot regarding the blind spot detected in step S3 of FIG. 4 (S11). FIG. 9 exemplifies a blind spot direction d10 from the own vehicle 2 toward the blind spot end 31a, a traveling direction d11 of the own vehicle 2, and a crossing direction d12 orthogonal to the traveling direction d11. For example, the controller 13 calculates a distance L in the blind spot direction d10 with reference to the blind spot end 31a based on the distance information obtained in steps S1 and S2 of FIG. 4.

Next, the controller 13 determines whether or not the calculated distance L exceeds a preset upper limit value (S12). For example, the upper limit value is a value indicating an upper limit of a range of the distance for which it is presumed that the blind spot object 4 needs to be detected from the possibility of collision between the blind spot object 4 and the own vehicle 2 (e.g., 120 m).

When determining that the distance L exceeds the upper limit value (YES in S12), the controller 13 sets the sensing density to "0" (S13), and ends the processing of step S4 in FIG. 4. In this case, the controller 13 proceeds to "YES" in subsequent step S5, and the detection processing of a blind spot object (S6) is omitted.

On the other hand, when determining that the distance L does not exceed the upper limit value (NO in S12), the controller 13 sets the sensing density in a range higher than "0" (S14 to S17). Hereinafter, a processing example of setting the sensing density according to the road condition from two levels M1 and M2 will be described.

At first, the controller 13 acquires road condition information as an example of the condition information from the road condition sensor 161, for example (S14). The road condition information includes the road condition in the range between the own vehicle 2 and the blind spot region R1. For example, the road condition sensor 161 detects the road condition directly under the own vehicle 2 or the road condition in front of the own vehicle 2 in the traveling direction, to output the road condition information, indicating the road condition of the detection result, to the controller 13. Note that the acquisition of the road condition information (S14) may be performed in and before step S12.

For example, the controller 13 determines whether or not the road condition is fine based on the road condition information acquired from the road condition sensor 161 (S15). For example, when the road condition information indicates a road condition of frozen, snow cover, with a water pool, or the like, the controller 13 determines that the road condition is not fine (NO in S15). In contrast, when the road condition information indicates a dry road condition, the controller 13 determines that the road condition is fine (YES in S15).

When determining that the road condition is fine (YES in S15), the controller 13 sets the sensing density to the standard level M1 (S16). The standard level M1 indicates the standard sensing density when the blind spot object 4 is detected.

On the other hand, when determining that the road condition is not fine (NO in S15), the controller 13 sets the sensing density to the high level M2 (S17). The high level M2 indicates a higher sensing density than standard level M1.

When setting the sensing density (S16 and S17), the controller 13 ends the processing of step S4 in FIG. 4. In this case, the controller 13 proceeds to "NO" in subsequent step S5, and executes the detection processing of a blind spot object (S6).

According to the above processing, the sensing density for detecting the blind spot object 4 is dynamically controlled according to the road condition of the road surface 3a on which the own vehicle 2 travels. Further, in a case where the distance L is sufficiently large, detection of the blind spot object 4 is controlled not to be performed. In this manner, the processing efficiency of the sensing device 1 can be improved.

In the above description, the example (S14 to S17) is described in which the sensing density is set from the two levels M1 and M2, but not limited thereto. For example, the sensing density may be set from three or more levels. For example, the controller 13 may use a level between the high level M2 and the standard level M1 for a wet road condition, or may use a level higher than the high level M2 for a more slippery condition such as frozen. Further, the sensing density may be set as a continuous value. The controller 13 can set a higher sensing density as the road condition is presumed to be more slippery, appropriately.

Further, in the above description, the example is described in which road condition information is acquired from the road condition sensor 161, but not limited thereto. For example, the road condition information may be acquired by such as image analysis with the camera 12 in step S2 or the like in FIG. 4. For example, in the image analysis, states such as dryness, a water pool such as a water film, snow cover, and frozen, of the road surface on the captured image may be determined, and various unevenness on the road surface may be detected. Further, regarding the brightness of a road surface on the image, the glossiness of the road surface may be detected from the average absolute deviation with respect to a low brightness portion, and the road surface state may be acquired according to the glossiness.

Further, the road condition information may be acquired by receiving various information from the communication interface 17. For example, based on the information indicating the weather for traveling of the own vehicle 2, the controller 13 may proceed to "YES" in step S15 in a case of fine weather as the road condition can be expected to be fine. Similarly, the controller 13 may proceed to "NO" in step S15 in a case of bad weather such as rain or snow.

In the above description, the distance L is used to set the sensing density to "0", but not particularly limited thereto. For example, as the distance L is larger, the sensing density may be set lower. The controller 13 may calculate the sensing density based on the road condition and the distance L.

Further, in the above description, the example is described in which the sensing density is set using the distance L in the blind spot direction d10. The sensing density setting processing of the present embodiment is not limited to this, and for example, the distance L2 in the crossing direction d12 may be used.

Figure 9:
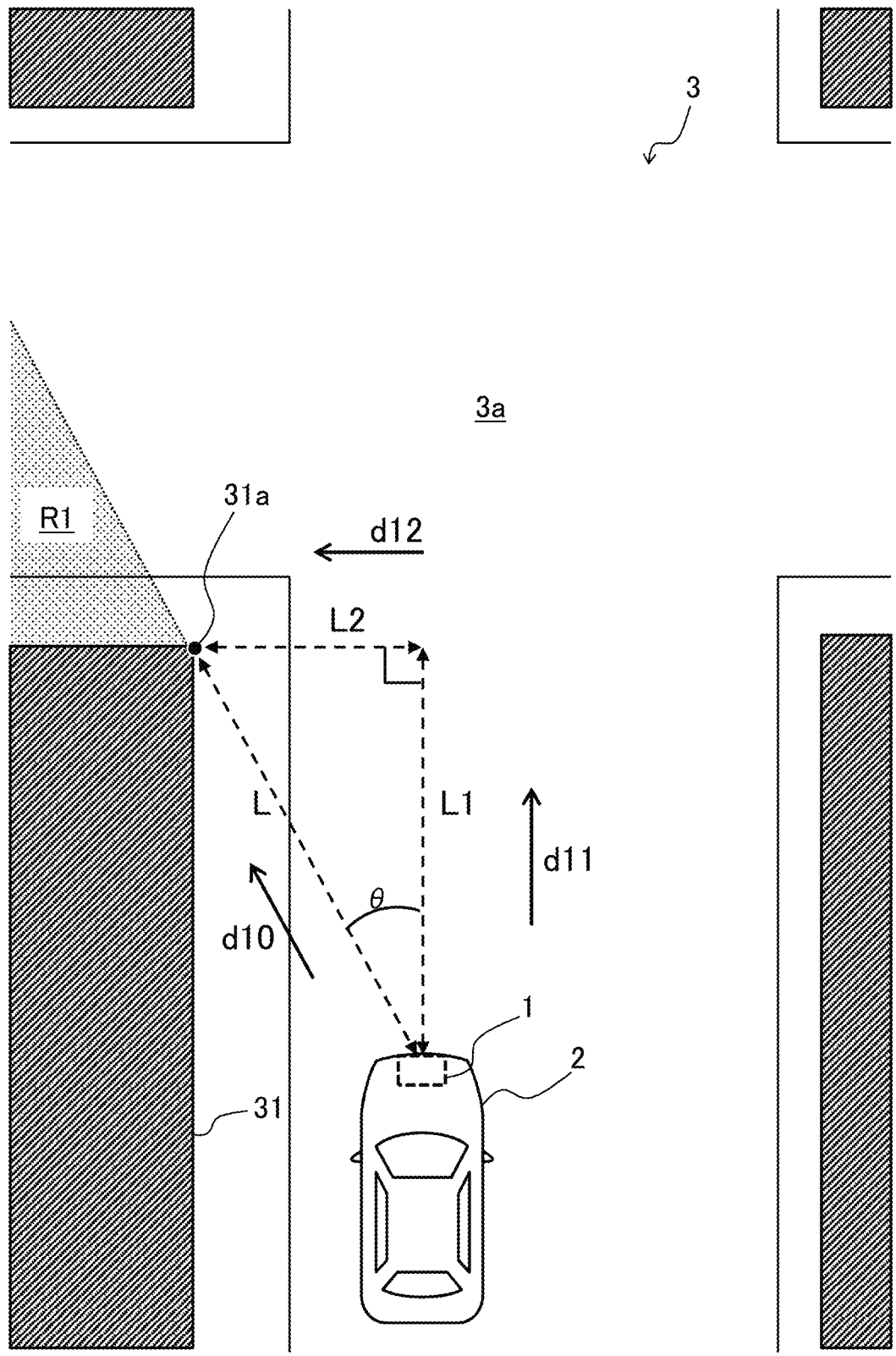
FIG. 9 is a diagram for describing the setting processing of the sensing density according to the first embodiment.

As exemplified in FIG. 9, the traveling direction d11 and the blind spot direction d10 of the own vehicle 2 form an angle $\theta$. Then, the distance L in the blind spot direction d10 can be orthogonally decomposed into a distance L1 in the traveling direction d11 and a distance L2 in the crossing direction d12. The controller 13 can calculate the respective distances L1 and L2 and the angle $\theta$ together with or separately from the distance L by acquiring the traveling direction d11 of the own vehicle 2 from the in-vehicle sensor 16, for example (S11).

When the distance L2 in the crossing direction d12 is sufficiently large, it is expected that the visibility of the intersection 3 and the like is fine, and that the influence of the blind spot is small. In view of the above, the controller 13 may set the sensing density smaller as the distance L2 in the crossing direction d12 is larger. In this manner as well, the processing efficiency of the sensing device 1 can be improved. The sensing density may be set using both the distances L and L2.

Figure 10:
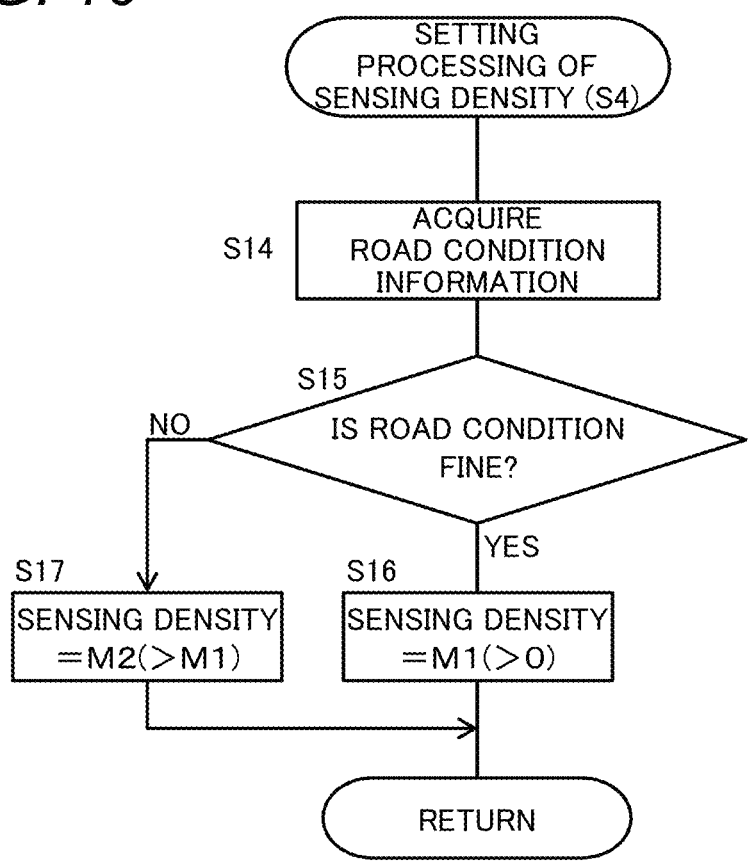
FIG. 10 is a flowchart showing a variation of the setting processing of the sensing density according to the first embodiment.

Further, the distance L does not need to be used in the setting processing of the sensing density. Such a variation is shown in FIG. 10. For example, steps S11 to S13 in FIG. 8 may be omitted as shown in FIG. 10. In this case, step S5 in FIG. 4 can also be omitted.

2-3. Detection Processing of Blind Spot Object

The detection processing of a blind spot object (S6 in FIG. 4) will be described with reference to FIG. 11 to FIG. 12.

Figure 11:
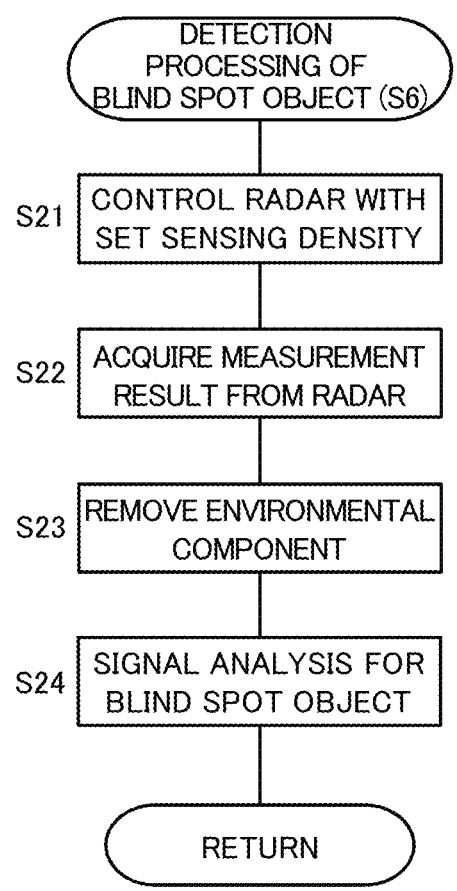
FIG. 11 is a flowchart exemplifying the detection processing of a blind spot object by the sensing device.

FIG. 11 is a flowchart exemplifying the detection processing of a blind spot object according to the present embodiment. FIG. 12 is a diagram for describing the detection processing of a blind spot object. The processing according to the flowchart of FIG. 11 is executed by the controller 13 that operates as the blind-spot-object measurer 132 in step S6 of FIG. 4.

At first, according to the sensing density set in the setting processing of the sensing density (S4 in FIG. 4), the controller 13 as the blind-spot-object measurer 132 controls the radar 11 to radiate the physical signal Sa to the blind spot region R1 (S21). For example, as the sensing density is higher, the controller 13 controls the radar 11 to shorten the time interval in which the radiation of the physical signal Sa is repeated for scanning or re-measurement more.

In step S21, the radar 11 radiates the physical signal Sa and receives the wave signal Sb to perform various measurement based on the reflected wave of the physical signal Sa. The controller 13 acquires a measurement result from the radar 11 (S22).

The controller 13 removes an environmental component showing a reflected wave from the surrounding environment from the acquired measurement result of the radar 11, to extract a signal component for analyzing the blind spot object (S23). The processing of step S23 is performed using the structural information D1 acquired in step S2 for example.

Figure 12:
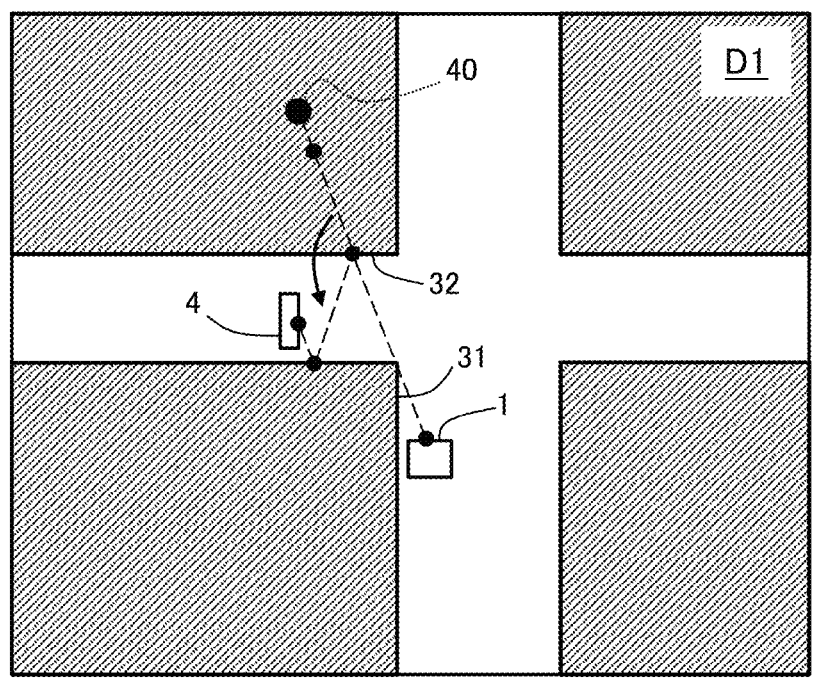
FIG. 12 is a diagram for describing the detection processing of a blind spot object by the sensing device.

In the example of FIG. 12, referring to the structural information D1 of the intersection 3, the controller 13 predicts a reflected wave due to direct reflection from various structures around the intersection 3, and subtracts a predicted environmental component from the measurement outcome of the radar 11, for example (S23). According to this, the influence of the reflected wave by the structure under an environment can be reduced, and it can be facilitated to obtain only the signal component of the object in the blind spot.

Next, the controller 13 performs signal analysis for detecting the blind spot object 4 based on the signal component obtained by removing the environmental component (S24). The signal analysis in step S24 may include various analysis such as frequency analysis, analysis on the time axis, spatial distribution, and signal strength.

In step S24, the controller 13 determines the presence or absence of the blind spot object 4 by analyzing whether or not a wave source is observed on the further side of the blind spot (facing wall 32) under the assumption that a propagation path of a wave is linear, for example. For example, a wave source 40 of the multiple reflected wave from the blind spot object 4 is observed to be on the further side than the facing wall 32 in the example of FIG. 12. Thus, the wave source 40 is at a position not predicted as an environmental component from the structural information D1. It can be expected that such a situation is caused by the multiple reflection of a wave from the object 4 in the blind spot. That is, the controller 13 can determine that the blind spot object 4 is present in a case where a reflected wave is observed at a distance exceeding the facing wall 32 in the direction of the detected blind spot.

Further, in a case where the blind spot object 4 is determined to be present, the controller 13 can calculate various measured values such as the distance to the blind spot object 4 and its speed, according to the propagation path in which refraction is predicted due to multiple reflections, for example. For example, by using information indicating a road width of the blind spot portion (width of the blind spot region R1) in the structural information D1, the controller 13 can calculate the position of the blind spot object 4 closer to the actual position with correction of a path length to the blind spot object 4, which is found from the signal component, in a manner folding back the path as exemplified in FIG. 12.

After the signal analysis (S24) of the blind spot object 4, the controller 13 ends the process of step S6 of FIG. 4. After that, the controller 13 executes the determination processing of a risk level (S7 in FIG. 4) for the blind spot object 4 for which signal analysis is performed.

According to the above processing, the blind spot object 4 can be detected by using a signal component generated inside the blind spot region R1, based on the property of multiple reflections in the physical signal Sa of the radar 11.

In step S21, the controller 13 controls the radar 11 according to the set sensing density. Accordingly, in a case where the sensing density is set to the standard level M1 (S16 in FIG. 8), the processing load can be reduced as compared with the case of the high level M2 (S17), for example. Thus, the blind spot object 4 can be detected efficiently.

The control according to the sensing density in step S21 is not limited to the above, and various control may be performed. For example, the controller 13 may increase the magnitude of output (i.e., the magnitude of the output signal) of the physical signal Sa radiated from the radar 11, or sharpen the directivity of radiation of the physical signal Sa as the sensing density increases. By controlling the directivity, it is possible to improve the substantial output for detecting the inside of a blind spot and to suppress a component that undergoes excessive multiple reflections.

In step S21, the controller 13 may widen a frequency band of the physical signal Sa or lengthen a signal length of the physical signal Sa as the sensing density increases. According to the control of the frequency band, the time resolution in a received wave can be improved, for example. Controlling the signal length can improve the frequency resolution for analyzing the Doppler shift.

In step S23, referring to a distance to the intersection in the vicinity of the blind spot in the structural information D1, the controller 13 may remove a signal component of a received wave obtained in the reciprocating propagation time of a signal or less, with respect to a linear distance from the intersection. Such a received wave is a directly reflected wave (i.e., a wave with one reflection) and does not include information on the blind spot object 4. Thus, is can be excluded from the object to be analyzed. Further, the controller 13 can separate a reflected wave arriving from the blind spot and a reflected wave arriving from another angle, based on an azimuth angle of the blind spot from the own vehicle 2.

The processing of step S23 does not need to use the structural information D1 of the surrounding environment. For example, the controller 13 may restrict the object to be analyzed to a moving object, by subtracting a position change of the own vehicle 2 from a signal obtained along the time axis. The present processing may be performed in the signal analysis in step S24.

In step S24, the controller 13 may analyze whether or not to find a characteristic that appears due to the behavior of a specific object, e.g., Doppler shift due to reflection on a moving object or fluctuation of the behavior peculiar to a person or a bicycle in the signal component to be analyzed. Further, the controller 13 may analyze whether area-measured signal distribution with spatial expanse has distribution peculiar to an automobile, a bicycle, a person or the like, or includes reflection by an automobile-sized metal body based on reflection intensity, or the like. The above analysis may be performed in combination as appropriate, or may be performed as a multidimensional feature quantity using machine learning instead of explicitly analyzing each.

2-4. Determination Processing of Risk Level

Figure 13:
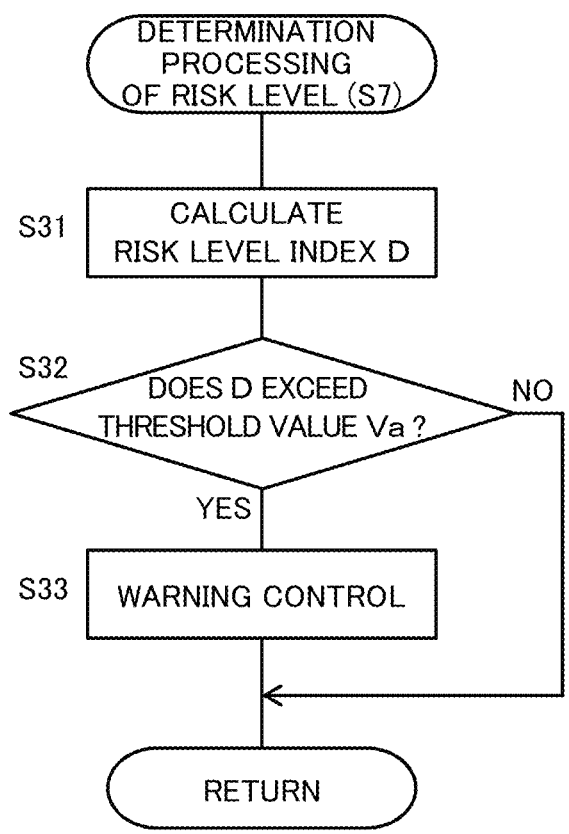
FIG. 13 is a flowchart exemplifying determination processing of a risk level by the sensing device.
Figure 14:
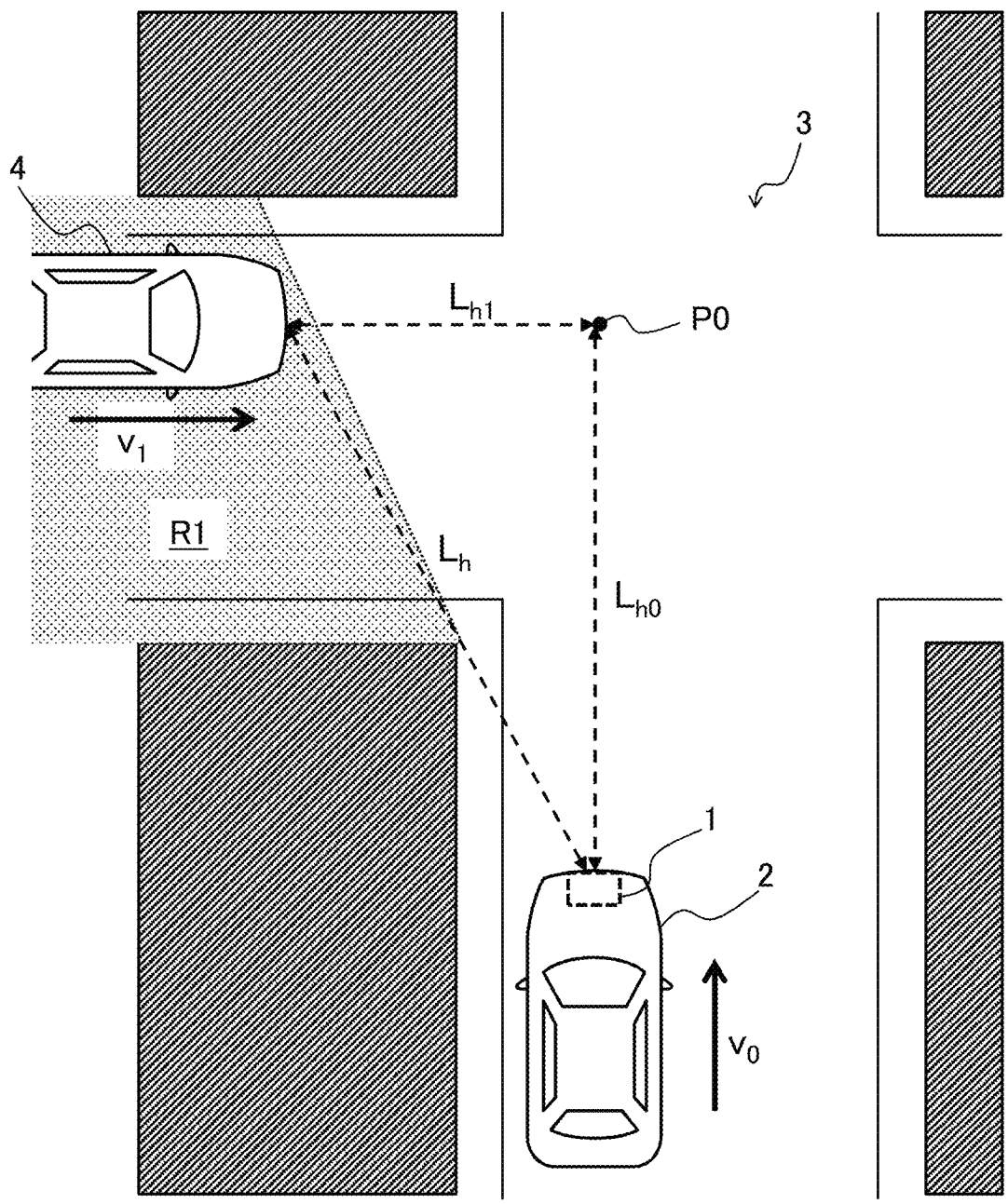
FIG. 14 is a diagram for describing determination processing of a risk level by the sensing device.

The determination processing of a risk level (S7 in FIG. 4) will be described with reference to FIG. 13 to FIG. 14. FIG. 13 is a flowchart exemplifying the determination processing of a risk level. FIG. 14 is a diagram for describing the determination processing of a risk level. The processing according to the flowchart of FIG. 13 is executed by the controller 13 that operates as the risk-level determiner 133 in step S7 of FIG. 4.

At first, the controller 13 calculates a risk level index D based on the detection result of the blind spot object 4 in step S6 (S31). The risk level index D indicates an index for determining a risk level of collision between the detected blind spot object 4 and the own vehicle 2. As exemplified in FIG. 14, the speed $v_1$ at which the blind spot object 4 approaches the own vehicle 2 can be set as the risk level index D.

Next, by using a preset threshold value Va, the controller 13 determines whether or not the calculated risk level index D exceeds the threshold value Va, for example (S32). The threshold value Va is set in consideration of the magnitude of the risk level index D that requires a warning regarding the blind spot object 4, for example. For example, when the risk level index D exceeds the threshold value Va when $D=v_1$, the controller 13 proceeds to "YES" in step S32.

When determining that the risk level index D exceeds the threshold value Va (YES in S32), the controller 13 performs various warning control as a result of determining the risk level at which a warning is required (S33). The warning control includes output of a control signal for causing the notification device 22 to issue a warning or the vehicle driving device 21 to perform specific control.

The controller 13 ends the determination processing of the risk level (S7 in FIG. 4) by performing the warning control (S33).

On the other hand, when determining that the risk index D does not exceed the threshold value Va (NO in S32), the controller 13 ends step S7 in FIG. 4 without particularly performing the warning control (S33), as a result of determining that no warning is required. Then, the controller 13 executes the flowchart of FIG. 4 again, for example.

According to the above processing, a risk level of the blind spot object 4 approaching the own vehicle 2 or the intersection 3 is determined according to the corresponding risk level index D. For example, binary determination is performed according to the necessity of a warning.

Note that the determination processing of a risk level is not limited to the binary determination, and for example, a ternary determination may be performed for determining whether or not attention calling in a case where a warning is unnecessary. For example, using a threshold value Vb (<Va) for attention calling, the controller 13 may determine whether or not D>Vb when proceeding to "NO" in step S32.

In the above processing, the risk level index D is not limited to the speed $v_1$, and can be set by (measured values of) various quantities related to the blind spot object 4. For example, the risk level index D may be set to an acceleration $dv_1/dt$ instead of the speed $v_1$.

Further, the risk level index D may be set to a distance Ln between the own vehicle 2 and the blind spot object 4. It is presumed that as the distance Ln is smaller, the risk level of collision between the own vehicle 2 and the blind spot object 4 is higher. In view of the above, in step S32, the controller 13 may proceed to "YES" in the case of the risk level index D ($=L_h$) falling below the threshold value Va, and may proceed to "NO" in the case of the risk level index D not falling below the threshold value Va, for example.

Further, the risk level index D may be set by a combination of various quantities. The risk level index D of such an example is shown in the following equation (1):

$$D=|(L_{h1}-v_1\Delta t)+(L_{h0}-v_0\Delta t)| \quad (1)$$

In the above equation (1), $L_{h1}$ is a distance from a reference position P0 to the blind spot object 4 (FIG. 13). The reference position P0 is set to a position where collision between the blind spot object 4 and the own vehicle 2 is expected, such as the center of an intersection. For example, the predetermined time width $\Delta t$ is set in the vicinity of a time width that the own vehicle 2 is predicted to take to reach the reference position P0. The distance $L_{h0}$ is a distance from the reference position P0 to the own vehicle 2. The speed $v_0$ of the own vehicle 2 can be acquired from the in-vehicle sensor 16 and the like.

The risk level index D in the above equation (1) is the sum of a distance between the blind spot object 4 and the reference position P0 and a distance between the reference position P0 and the own vehicle 2 estimated after the time width $\Delta t$ elapses (FIG. 13). According to the above equation (1), it can be estimated that when the risk level index D is smaller than a predetermined value, the possibility that the own vehicle 2 and the blind spot object 4 reach the reference position P0 at the same time is sufficiently high. As determination of a risk level corresponding to the above estimation with the above equation (1), the controller 13 may proceed to "YES" in step S32 in the case of the risk level index D falling below the threshold value Va, and may proceed to "NO" in the case of the risk level index D not falling below the threshold value Va, as in the case of D=$L_h$.

Further, the risk level index D may be set as in the following equation (2) or equation (2'):

$$D=L_{h1}-v_1\Delta t \qquad (2)$$

$$D=|L_{h1}-v_1\Delta t| \qquad (2')$$

In each of the above equations (2) and (2'), $\Delta t = L_{h0}/v_0$ is set for example. The time width $\Delta t$ may be set within an allowable range in consideration of a fluctuation of the speed $v_0$ of the own vehicle 2 or an estimation error of the reference position P0.

When the risk level index D in the equation (2) is smaller than the predetermined value (including a negative value), it can be estimated that the possibility, for which the blind spot object 4 crosses the front of the own vehicle 2 before the own vehicle 2 reaches the reference position P0, is sufficiently high. Further, when the risk level index D (an absolute value in the case of the equation (2)) of equation (2') is smaller than the predetermined value, it can be estimated that the possibility, for which the own vehicle 2 and the blind spot object 4 exist at the reference position P0 at the same time, is sufficiently high. In response to the above estimation, the controller 13 can use the risk level index D of the equation (2) or the equation (2') to determine a risk level as in the case of the equation (1).

In the above determination processing of a risk level, the threshold value Va may be dynamically changed according to states of the own vehicle 2 and the blind spot object 4. For example, in a case where $L_{h0}$ described above is small, $dv_0/dt$ or $dv_1/dt$ is large, or the blind spot object 4 is estimated to be a person, it is considered that the determination of a risk level should be performed more strictly. In view of the above, when such a case is detected, the controller 13 may increase the threshold value Va with respect to the risk level index D of the above equation (1), for example.

3. Summary

As described above, the sensing device 1 according to the present embodiment detects an object in a blind spot, that is the blind spot object 4, in the surrounding environment of the own vehicle 2 which is an example of a mobile body. The sensing device 1 includes the camera 12 as a distance measurer, the radar 11 as a detector, the controller 13, and the road condition sensor 161 as a state receiver. The camera 12 acquires distance information indicating a distance from the own vehicle 2 to the surrounding environment. The radar 11 detects an object in a blind spot. The controller 13 controls operation of the radar 11. The road condition sensor 161 acquires road condition information as an example of condition information indicating a condition related to slipperiness of the road surface 3a on which the own vehicle 2 travels. The controller 13 detects a blind spot in the surrounding environment, based on the acquired distance information (S3). The controller 13 controls the precision at which the detector detects an object in the blind spot, that is, the sensing density, in accordance with the condition information such as road surface information (S4).

According to the above sensing device 1, by controlling the sensing density according to the condition information related to slipperiness, it is possible to efficiently detect an object in a blind spot in the surrounding environment of the own vehicle 2.

In the sensing device 1 of the present embodiment, the controller 13 sets the sensing density higher as the slipperiness of the own vehicle 2 is larger based on the condition information (S14 to S17). The detection accuracy of the blind spot object 4 can be improved when the own vehicle 2 is in a slippery condition, and the inside of the blind spot can be detected efficiently.

In the sensing device 1 of the present embodiment, the road condition information includes at least one condition of dryness, a water pool, frozen, and snow cover on the road surface. From the road condition information, it is possible to specifically determine whether the slipperiness of the own vehicle 2 is large or small.

In the sensing device 1 of the present embodiment, the state receiver includes at least one of the camera 11 that captures an image of the road surface 3a, a road condition sensor 16a that detects the state of the road surface 3a, and the communication interface 17 that receives information indicating the weather. The controller 13 can set the sensing density according to the road condition information by using any of the state receivers.

In the sensing device 1 of the present embodiment, the controller 13 controls the precision according to the distance L to the blind spot and the condition information (S11 to S17). For example, as the distance L is larger, the sensing density may be set smaller (S14 to S16). When the blind spot is far from the own vehicle 2, the inside of the blind spot can be detected efficiently with the processing load being reduced. The controller 13 may set the sensing density smaller as the distance L2 between the own vehicle 2 and the blind spot in the crossing direction d12 is larger.

In the sensing device 1 of the present embodiment, the controller 13 may control the radar 11 so as not to detect the blind spot object 4 when the distance L to the blind spot is larger than a predetermined upper limit value (S12 to S13). In this manner, in a situation where the possibility of a collision between the blind spot object 4 and the own vehicle 2 is expected to be sufficiently small, the detection of the blind spot object 4 can be omitted and the processing efficiency can be improved.

In the sensing device 1 of the present embodiment, the radar 11 radiates the physical signal Sa as an output signal having a wave characteristic from the own vehicle 2 to the surrounding environment, and the blind spot object 4 is detected based on a component of a wave arriving from the blind spot in the reflected wave of the radiated physical signal Sa. In this manner, a wave characteristic of the physical signal Sa from the radar 11 can be utilized to detect an object existing in a blind spot in the surrounding environment from the own vehicle 2. The wave to be utilized is not limited to a multiple reflected wave, and may include a diffracted wave or a transmitted wave.

In the sensing device 1 of the present embodiment, the sensing density is set corresponding to at least one of magnitude, time interval, directivity, frequency band, and signal length of the output signal of the radar 11 (S21). Reduction in the processing load can be achieved by control of various parameters of the radar 11 according to the sensing density.

In the sensing device 1 of the present embodiment, when detecting the blind spot region R1 in the surrounding environment, the controller 13 may control the radar 11 to radiate the physical signal Sa toward the detected blind spot region R1 (S21). In this manner, the physical signal Sa can be concentrated in the vicinity of the blind spot region R1, and the multiple reflected waves Rb1 and the like can be easily obtained from the blind spot object 4 in the blind spot region R1. Note that the physical signal Sa from the radar 11 does not need to be concentrated in the blind spot region R1. For example, the physical signal Sa may be radiated in a range that can be detected by the radar 11 in a timely manner.

The sensing device 1 of the present embodiment may further include the storage 14 that stores structural information D1 indicating an object structure of the surrounding environment. Referring to the structural information D1, the controller 13 may analyze a wave signal including a component of a wave arriving from the blind spot region R1 in the detection result of the radar 11. By using the structural information D1, the detection of the blind spot object 4 can be made accurate. The controller 13 may generate the structural information D1 based on the detection result of the camera 12 and hold the structural information D1 in the storage 14 (S2). The structural information D1 can be generated sequentially so that the blind spot object 4 can be detected with high accuracy.

The mobile body system according to the present embodiment includes the sensing device 1 and the vehicle control device 20. The vehicle control device 20 is mounted on the own vehicle 2 and executes operation according to the detection result of the blind spot object 4 by the sensing device 1. In the mobile body system, the sensing device 1 can efficiently detect an object in a blind spot in the surrounding environment of the own vehicle 2.

The sending method according to the present embodiment is a method of detecting an object in a blind spot in the surrounding environment of a mobile body such as the own vehicle 2. The present method includes step S1 in which the distance measurer acquires distance information indicating a distance from the mobile body to the surrounding environment, and steps S2 and S3 in which the controller 13 detects a blind spot in the surrounding environment based on the distance information. The present method includes step S14 in which the state receiver acquires condition information indicating a condition related to the slipperiness of the mobile body on the road surface on which the mobile body travels. The present method includes step S4 in which the controller 13 controls the sensing density in which the detector is caused to detect an object in the blind spot according to the condition information, and step S6 in which the detector detects an object in the blind spot in the sensing density.

In the present embodiment, a program for causing the controller 13 to execute the above sensing method is provided. According to the sensing method of the present embodiment, it is possible to efficiently detect an object existing in a blind spot in the surrounding environment of a mobile body such as the own vehicle 2.

Second Embodiment

Figure 15:
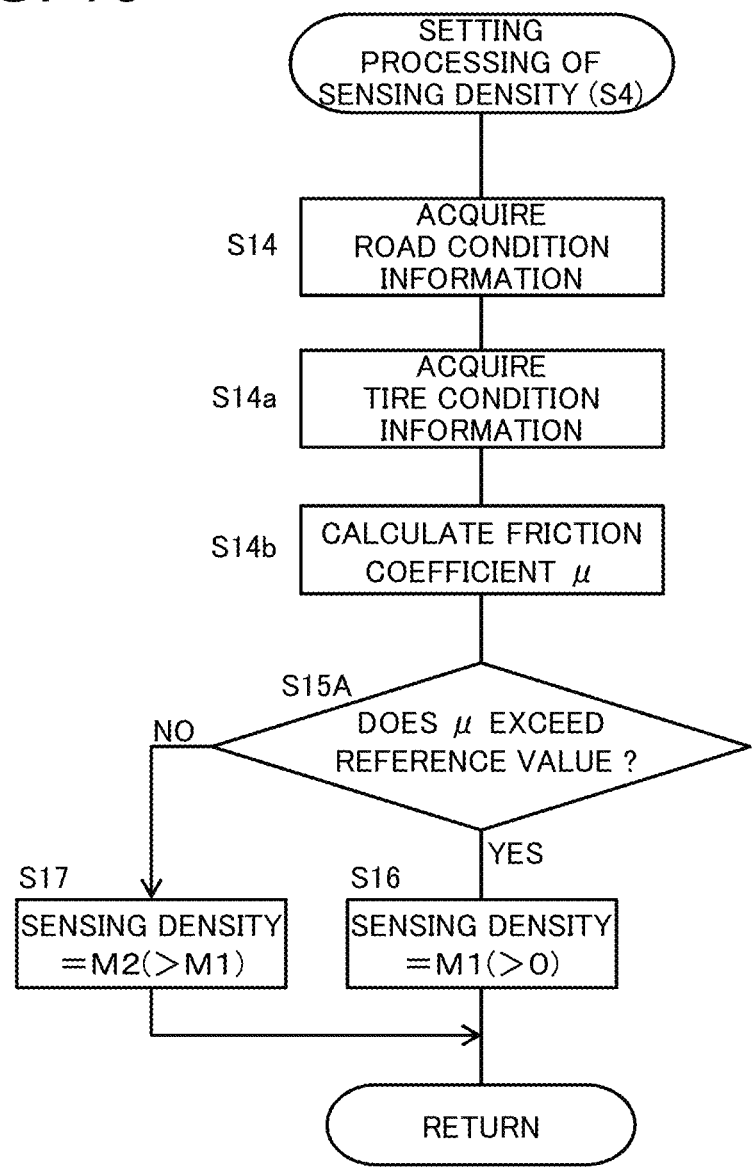
FIG. 15 is a flowchart exemplifying a setting processing of a sensing density according to a second embodiment.

In the first embodiment, the example of controlling the sensing density according to the road condition is described. However, other information may be used. In the present embodiment, an operation example using a tire condition will be described with reference to FIG. 15. FIG. 15 is a flowchart exemplifying the setting processing of the sensing density according to the present embodiment.

In the present embodiment, in addition to the same processing as in FIG. 10, the controller 13 acquires tire condition information (S14a) as shown in FIG. 15, wherein the tire condition information is an example of condition information indicating a detection result of a tire condition by the tire condition sensor 162. The controller 13 calculates a friction coefficient μ based on the road surface information and the tire condition information acquired in steps S14 and S14a, for example (S14b). The friction coefficient μ indicates the friction between a tire of the own vehicle 2 and the road surface 3a, and is defined by a sliding friction coefficient, for example.

For example, instead of step S15 in FIG. 10, the controller 13 determines whether or not the calculated friction coefficient μ exceeds a predetermined reference value (S15A). As the friction coefficient μ is smaller, the slipperiness for the own vehicle 2 to travel on the road surface 3a is larger. In view of the above, when determining that the friction coefficient n exceeds the reference value (YES in S15A), the controller 13 sets the sensing density to the standard level M1 (S16), for example. Also, when determining that the friction coefficient n does not exceed the reference value (YES in S15A), the controller 13 sets the sensing density to the high level M2 (S17). The controller 13 may appropriately set the sensing density to be higher as the friction coefficient μ is smaller.

In the above example, the example of setting the sensing density by using the road surface information and the tire condition information is described. However, the road surface information does not need to be used. For example, instead of step S15A, the controller 13 may determine whether or not a wear amount of the tire 2a of the own vehicle 2 exceeds a predetermined reference value based on the tire condition information acquired in step S14b. Then, the controller 13 may set the sensing density to be higher as the wear amount is larger. In this case, steps S14 and S14b can be omitted.

As described above, in the present embodiment, the own vehicle 2 includes the tire 2a, and the state receiver includes the tire condition sensor 162. The tire condition sensor 162 detects a condition of the tire 2a as the condition information. Even with such condition information, the processing efficiency of the sensing device 1 can be improved in a manner that the sensing density is set to be higher as the tire 2a is in a more slippery state.

Third Embodiment

In the second embodiment, the operation example is described in which the sensing density is controlled using the road condition and the tire condition. In the present embodiment, operation of the sensing device 1 that controls the sensing density by using the speed of the own vehicle 2 will be further described.

Figure 16:
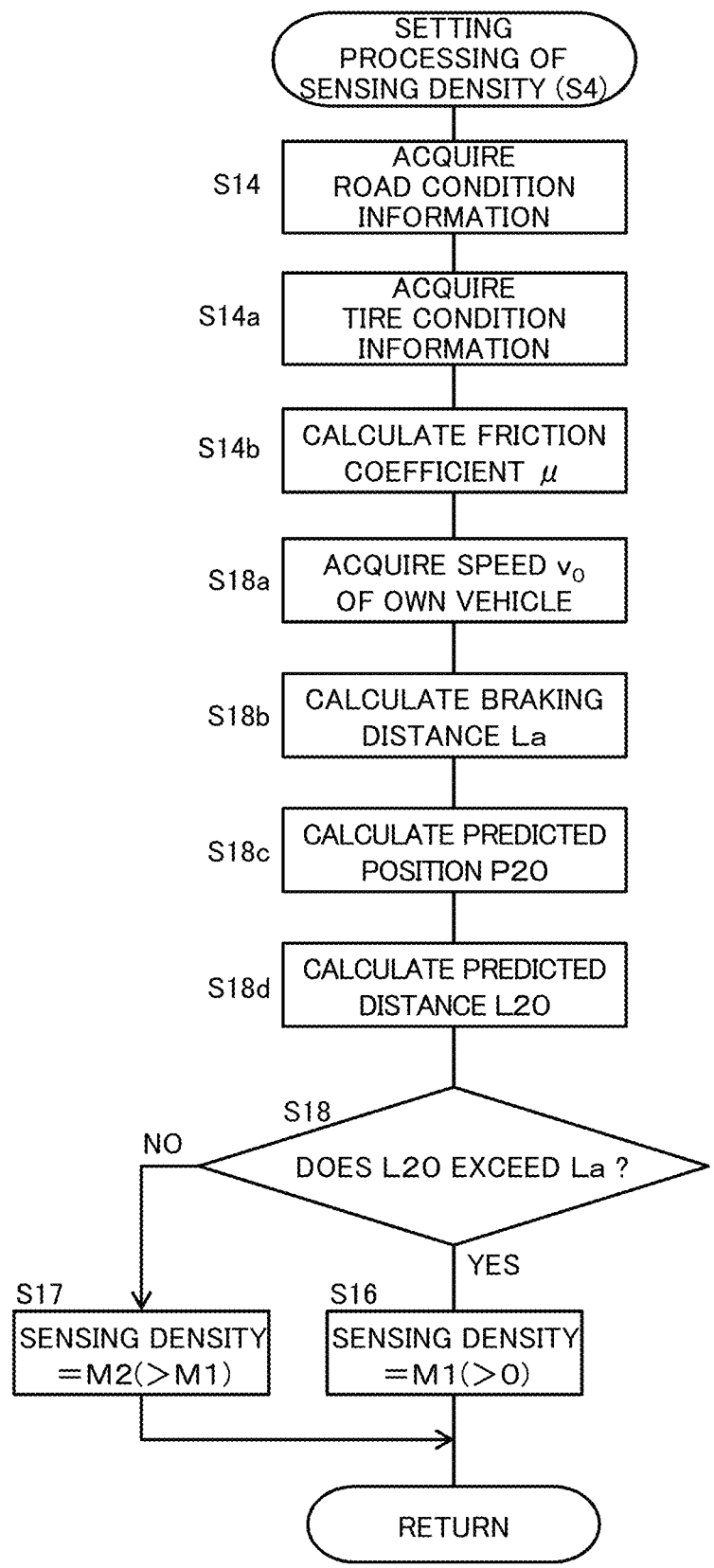
FIG. 16 is a flowchart exemplifying a setting processing of a sensing density according to a third embodiment.
Figure 17:
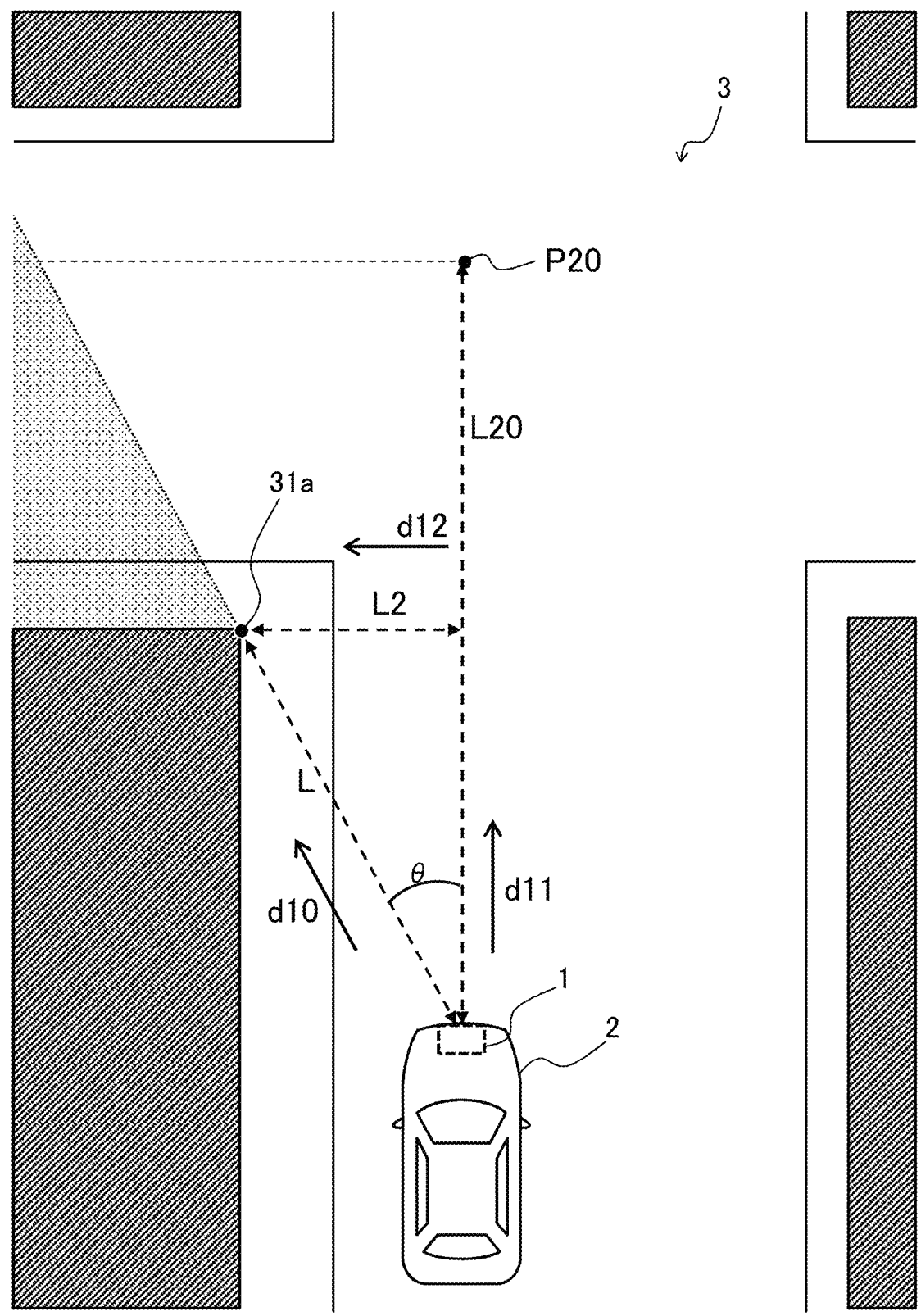
FIG. 17 is a diagram for describing the setting processing of the sensing density according to the third embodiment.

FIG. 16 is a flowchart exemplifying the setting processing of the sensing density according to a third embodiment. FIG. 17 is a diagram for describing the setting processing of the sensing density according to the present embodiment.

In the present embodiment, in addition to processing same as that in the second embodiment (FIG. 15), the controller 13 acquires a speed $v_0$ of the own vehicle 2 from the in-vehicle sensor 16 (S18a), and calculates a braking distance La by the following equation (20), for example (S18b):

$$La = v_0^2 / (2 \times g \times \mu) \qquad (20)$$

In the above equation (20), g indicates a gravitational acceleration, and, e.g., g=9.8.

Furthermore, as shown in FIG. 17, in a case where a moving object such as a vehicle exists in a blind spot to be detected, the controller 13 calculates a predicted position P20 at which the moving object is predicted to collide with the own vehicle 2 (S18c), and calculates a predicted distance L20 from the own vehicle 2 to the predicted position P20 (S18d). For example, the controller 13 can calculate the predicted position P20 and the predicted distance L20 based on the structural information D1 acquired in real time.

The controller 13 determines whether or not the predicted distance L20 exceeds the braking distance La, for example (S18). When the predicted distance L20 exceeds the braking distance La, the own vehicle 2 can stop before reaching the predicted position P20. In view of the above, when determining that the predicted distance L20 exceeds the braking distance La (YES in S18), the controller 13 sets the sensing density to be smaller than that in the case of "NO", for example (S16). At this time, the controller 13 may set the sensing density to "0" and control the detection in a blind spot not to be performed.

As described above, the sensing device 1 of the present embodiment further includes the in-vehicle sensor 16 which is an example of a speed receiver. The in-vehicle sensor 16 acquires the speed $v_0$ of the own vehicle 2. The controller 13 sets the sensing density based on the braking distance La of the own vehicle 2 according to the speed $v_0$ and the distance to the blind spot. In this manner, the inside of the blind spot is detected in consideration of the braking distance La of the own vehicle 2, and the safety can be improved.

Other Embodiments

In the first to fourth embodiments, the sensing density is set by using various condition information. However, the condition information may be used for the determination processing of a risk level. The present variation will be described with reference to FIG. 18.

Figure 18:
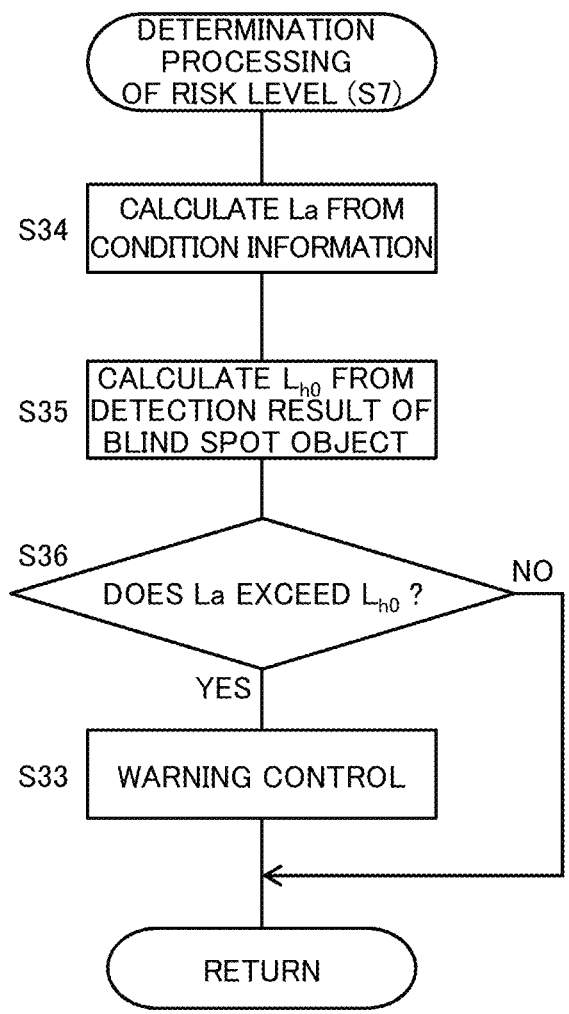
FIG. 18 is a flowchart for describing a variation of determination processing of a risk level by the sensing device.

FIG. 18 is a flowchart for describing a variation of the risk level determination processing. In the present variation, the controller 13 determines a risk level using the condition information for a detection result of the inside of a blind spot (S34 to S36) instead of steps S31 to S33 in FIG. 13.

For example, the controller 13 calculates the braking distance La based on various condition information (S34), as in the third embodiment (FIG. 16). Further, the controller 13 calculates the distance $L_{h0}$ (FIG. 14) from the position P0 to the own vehicle 2, at which a collision with the blind spot object 4 is predicted, based on the detection result by the detection processing of a blind spot object (S6 in FIG. 4) (S35). The controller 13 compares and determines the braking distance La and the distance $L_{h0}$ in the same manner as in step S18 of FIG. 16 (S36). When determining that the braking distance La exceeds the distance $L_{h0}$ (YES in S36), the controller 13 performs warning control as a determination result of a risk level requiring a warning (S33).

As described above, the controller 13 may determine a risk level regarding a blind spot based on the detection result of the blind spot object 4 and the condition information (S34 to S36). In this manner, warning control and the like can be performed in a manner that, as the own vehicle 2 is in a more slippery state when traveling on the road surface 3a, the determination standard for a risk level is made stricter. In this manner, the safety of the driver and the like of the own vehicle 2 can be improved.

In each of the above embodiments, the multiple reflected wave is utilized for detecting the blind spot object 4. However, the wave is not limited to the multiple reflected wave, and for example, a diffracted wave may be utilized. For example, it is conceivable that the reflected wave of the blind spot object 4 is diffracted at the blind spot end 31a and returns to the own vehicle 2 as a diffracted wave. The controller 13 of the present embodiment controls the wavelength and direction of the physical signal Sa radiated from the radar 11 so as to cause wraparound at the blind spot end 31a, for example.

For example, as the physical signal Sa having a wavelength larger than that of visible light is used, the signal can be allowed to reach even a region which cannot be geometrically reached by visible light having high straightness and the like due to the existence of various shielding objects. Further, since a vehicle, a person, and the like that can be the blind spot object 4 usually have a rounded shape, the signal is reflected not only to a completely reflexive path, but also in the direction in which the own vehicle 2, from which the signal is radiated, exists. When such a reflected wave causes a diffraction phenomenon with respect to the shielding wall 31 and propagates, the radar 11 can receive the diffracted wave as a signal component to be analyzed.

The signal component of the diffracted wave has information on the propagation path to the blind spot object 4 and Doppler information according to the moving speed. Therefore, as signal analysis is performed on the signal component, the position and speed of the blind spot object 4 can be measured from the information on the propagation time, phase, and frequency of the signal component, as in the first embodiment. At this time, the propagation path of the diffracted wave can also be estimated from the distance to the blind spot end 31a or various the structural information D1. Further, the propagation path in which multiple reflection and diffraction are combined can also be estimated as appropriate, and the signal component of such a wave may be analyzed.

In each of the above embodiments, the example is described in which the detector and the distance measurer are separately configured by the radar 11 and the camera 12 or the like. However, the detector and the distance measurer may be integrally configured. For example, the sensing device 1 of the present variation uses the radar 11 to perform peripheral monitoring similar to that in S1 to S3 in FIG. 4. Further, when a blind spot is found in the present variation, the controller 13 may perform switching control of the band of the radar 11, to use a band that allows wraparound to likely occur at the blind spot, for example.

Further, in each of the above embodiments, the radar 11, the camera 12, and the navigation device 15 are described as examples of the detector and the distance measurer. The detector of the present embodiment is not limited to these, and for example, the detector or the distance measurer may be LIDAR. The physical signal Sa radiated from the detector may be an infrared ray, for example. Further, the detector or the distance measurer may be sonar, or may radiate an ultrasonic wave as the physical signal Sa. In these cases, the wave signal Sb received by the detector is set in the same manner as the corresponding physical signal Sa.

Further, in each of the above embodiments, the example is described in which the radar 11 and the camera 12 are installed with the orientation frontward for the own vehicle 2. However, the installation position of the radar 11 and the like is not particularly limited. For example, the radar 11 and the like may be installed with an orientation rearward for the own vehicle 2, and e.g., the mobile body system may be used for parking assistance. Further, the number of the radars 11 is not particularly limited, and may be provided on both sides of the own vehicle 2, for example. For example, each of a plurality of the radars 11 may be used to detect the inside of different blind spots.

Further, in each of the above embodiments, the sensing device 1 detects the blind spot object 4 by utilizing the characteristics of the wave by the physical signal Sa. In the present embodiment, the method of detecting the blind spot object 4 is not necessarily limited to the above method, and various methods may be employed. The object 4 in the blind spot region R1 may be estimated based on various information. Even in this case, the processing efficiency can be improved by controlling the density according to the distance to a blind spot.

Further, in each of the above embodiments, an automobile is exemplified as an example of the mobile body. The mobile body on which the sensing device 1 is mounted is not particularly limited to an automobile, and may be, e.g., an AGV or a service robot. For example, the sensing device 1 may detect an object in a blind spot by monitoring the surroundings during the automatic traveling of the AGV.

Additional Note

Various embodiments of the present disclosure are described above. However, the present disclosure is not limited to the above content, and various changes can be made within the scope of substantially the same technical idea. Hereinafter, various aspects according to the present disclosure will be noted.

A first aspect according to the present disclosure is a sensing device (1) for detecting an object in a blind spot in a surrounding environment of a mobile body. The sensing device includes a distance measurer (12), a detector (11), a controller (13), and a state receiver (161). The distance measurer is configured to acquire distance information indicating a distance from the mobile body to the surrounding environment. The detector is configured to detect the object in the blind spot. The controller is configured to control operation of the detector. The state receiver is configured to acquire condition information indicating a state relating to slipperiness of the mobile body on a road surface on which the mobile body travels. The controller is configured to detect the blind spot in the surrounding environment, based on the distance information acquired by the distance measurer (S3). The controller is configured to control precision at which the detector is caused to detect the object in the blind spot, according to the condition information acquired by the state receiver (S4).

As a second aspect, in the sensing device according to the first aspect, the controller is configured to set the precision to be higher as the slipperiness of the mobile body is higher, based on the condition information (S14 to S17).

As a third aspect, in the sensing device according to the first or second aspect, the condition information includes at least one condition of dryness, a water pool, frozen, and snow cover on the road surface.

As a fourth aspect, in the sensing device according to any one of the first to third aspects, the state receiver includes at least one of a camera (12) configured to capture an image of the road surface, a road condition sensor (161) configured to detect a state of the road surface, and a communication interface configured to receive information indicating weather.

As a fifth aspect, for the sensing device according to any one of the first to fourth aspects, the mobile body includes a tire (2a). The state receiver includes a tire condition sensor (162) configured to detect a condition of the tire as the condition information.

As a sixth aspect, in the sensing device according to any one of the first to fifth aspects, the controller is configured to control the precision according to a distance to the blind spot and the condition information (S11 to S17).

As a seventh aspect, in the sensing device according to any one of the first to sixth aspects, the controller is configured to determine a risk level related to the blind spot based on a detection result of the object in the blind spot and the condition information (S34 to S36).

As an eighth aspect, in the sensing device according to any one of the first to seventh aspects, the detector is configured to: radiate an output signal having a wave characteristic from the mobile body to the blind spot; and detect the object in the blind spot based on a component of a wave arriving from the blind spot in a reflected wave of a radiated output signal.

As a ninth aspect, in the sensing device according to the eighth aspect, the precision is set according to at least one of magnitude, a time interval, directivity, a frequency band, and a signal length of the output signal of the detector.

A tenth aspect according to the present disclosure is a mobile body system including: the sensing device according to any one of the first to ninth aspects; and a control device (20). The control device is arranged on the mobile body to execute operation according to a detection result of the object in the blind spot by the sensing device.

An eleventh aspect according to the present disclosure is a sensing method of detecting an object in a blind spot in a surrounding environment of a mobile body (2). The sensing method includes: acquiring (S1), by a distance measurer (12), distance information indicating a distance from the mobile body to the surrounding environment; and detecting (S2, S3), by a controller (13), the blind spot in the surrounding environment, based on the distance information. Further, the present method includes acquiring (S14), by a state receiver (161), condition information indicating a state relating to slipperiness of the mobile body on a road surface on which the mobile body travels. The present method includes: controlling (S4), by the controller, precision at which a detector is caused to detect an object in the blind spot, according to the condition information; and detecting (S6), by the detector (11), the object in the blind spot at the precision.

A twelfth aspect according to the present disclosure is a program for causing a controller to execute the sensing method according to the eleventh aspect.

REFERENCE SIGNS LIST 1 sensing device
11 radar
12 camera
13 controller
14 storage
15 navigation device
16 in-vehicle sensor
161 road condition sensor
162 tire condition sensor
17 communication interface
2 own vehicle
2a tire
20 vehicle control device

The invention claimed is:

1. A sensing device for detecting an object in a blind spot in a surrounding environment of a mobile body, the sensing device comprising:
  a distance measurer configured to acquire distance information indicating a distance from the mobile body to the surrounding environment a detector configured to detect the object in the blind spot;

a controller configured to control operation of the detector; and a state receiver configured to acquire condition information indicating a state relating to slipperiness of the mobile body on a road surface on which the mobile body travels, wherein the controller is configured to:

detect the blind spot in the surrounding environment, based on the distance information acquired by the distance measurer; and control precision at which the detector is caused to detect the object in the blind spot, according to the condition information acquired by the state receiver.

2. The sensing device according to claim 1, wherein the controller is configured to set the precision to be higher as the slipperiness of the mobile body is higher, based on the condition information.

3. The sensing device according to claim 1, wherein the condition information includes at least one condition of dryness, a water pool, frozen, and snow cover on the road surface.

4. The sensing device according to claim 1, wherein the state receiver includes at least one of a camera configured to capture an image of the road surface, a road condition sensor configured to detect a state of the road surface, and a communication interface configured to receive information indicating weather.

5. The sensing device according to claim 1, wherein
the mobile body includes a tire, and
the state receiver includes a tire condition sensor configured to detect a condition of the tire as the condition information.

6. The sensing device according to claim 1, wherein the controller is configured to control the precision according to a distance to the blind spot and the condition information.

7. The sensing device according to claim 1, wherein the controller is configured to determine a risk level related to the blind spot based on a detection result of the object in the blind spot and the condition information.

8. The sensing device according to claim 1, wherein the detector is configured to:

radiate an output signal having a wave characteristic from the mobile body to the blind spot; and detect the object in the blind spot based on a component of a wave arriving from the blind spot in a reflected wave of a radiated output signal.

9. The sensing device according to claim 8, wherein the precision is set according to at least one of magnitude, a time interval, directivity, a frequency band, and a signal length of the output signal of the detector.

10. A mobile body system comprising:
the sensing device according to claim 1; and
a control device arranged on the mobile body to execute operation according to a detection result of the object in the blind spot by the sensing device.

11. A sensing method of detecting an object in a blind spot in a surrounding environment of a mobile body, the sensing method comprising:

acquiring, by a distance measurer, distance information indicating a distance from the mobile body to the surrounding environment;

acquiring, by a state receiver, condition information indicating a state relating to slipperiness of the mobile body on a road surface on which the mobile body travels;

detecting, by a controller, the blind spot in the surrounding environment, based on the distance information;

controlling, by the controller, precision at which a detector is caused to detect an object in the blind spot, according to the condition information; and detecting, by the detector, the object in the blind spot at the precision.

12. A non-transitory computer-readable recording medium storing a program for causing a controller to execute the sensing method according to claim 11.

* * * * *